(12) United States Patent
Honda

(10) Patent No.: US 8,950,202 B2
(45) Date of Patent: Feb. 10, 2015

(54) HEAT PUMP SYSTEM

(75) Inventor: Masahiro Honda, Osaka (BE)

(73) Assignees: Daikin Industries, Ltd., Osaka (JP);
Daikin Europe N.V., Oostende (BE)

( * ) Notice: Subject to any disclaimer, the term of this patent is extended or adjusted under 35 U.S.C. 154(b) by 384 days.

(21) Appl. No.: 13/574,122

(22) PCT Filed: Jan. 29, 2010

(86) PCT No.: PCT/JP2010/000531
§ 371 (c)(1),
(2), (4) Date: Jul. 19, 2012

(87) PCT Pub. No.: WO2011/092742
PCT Pub. Date: Aug. 4, 2011

(65) Prior Publication Data
US 2012/0297806 A1 Nov. 29, 2012

(51) Int. Cl.
*F25B 45/00* (2006.01)
*F25B 30/02* (2006.01)
(Continued)

(52) U.S. Cl.
CPC ............... *F25B 30/02* (2013.01); *F25B 13/00* (2013.01); *F25B 7/00* (2013.01); *F25B 25/005* (2013.01); *F25B 41/062* (2013.01); *F25B 2313/006* (2013.01); *F25B 2313/0233* (2013.01); *F25B 2313/0314* (2013.01); *F25B 2313/0315* (2013.01); *F25B 2400/13* (2013.01);
(Continued)

(58) Field of Classification Search
USPC ............... 62/222, 224, 225, 160, 149
See application file for complete search history.

(56) References Cited

U.S. PATENT DOCUMENTS

2001/0000050 A1* 3/2001 Okazaki et al. ............. 62/149
2005/0198994 A1 9/2005 Mizutani et al.
(Continued)

FOREIGN PATENT DOCUMENTS

JP 02157568 A * 6/1990
JP 2004-263885 A 9/2004
(Continued)

OTHER PUBLICATIONS

International Preliminary Report of corresponding PCT Application No. PCT/JP2010/000531.
(Continued)

*Primary Examiner* — Allana Lewin
*Assistant Examiner* — Kun Kai Ma
(74) *Attorney, Agent, or Firm* — Global IP Counselors

(57) ABSTRACT

A heat pump system includes a refrigerant circuit and a controller. In a heating operation, the usage-side expansion valve is controlled so that a degree of subcooling of outlet refrigerant of the usage-side heat exchanger is equal to a predetermined target degree of subcooling. In a refrigerant recovery control, the heat-source-side expansion valve is controlled so that a degree of superheat of outlet refrigerant of the heat-source-side heat exchanger is equal to a predetermined target degree of superheat, the predetermined target degree of superheat is changed so that the outlet refrigerant of the heat-source-side heat exchanger is wet when the usage-side expansion valve is opened greater than a predetermined opening degree at a start of refrigerant recovery, and change in the predetermined target degree of superheat is cancelled when the usage-side expansion valve is closed smaller than a predetermined opening degree at an end of refrigerant recovery.

10 Claims, 5 Drawing Sheets

(51) Int. Cl.
*F25B 13/00* (2006.01)
*F25B 7/00* (2006.01)
*F25B 25/00* (2006.01)
*F25B 41/06* (2006.01)

(52) U.S. Cl.
CPC . *F25B2600/2513* (2013.01); *F25B 2700/1931* (2013.01); *F25B 2700/1933* (2013.01); *F25B 2700/21151* (2013.01); *F25B 2700/21152* (2013.01); *F25B 2700/21161* (2013.01); *F25B 2700/21162* (2013.01); *F25B 2700/21163* (2013.01); *F25B 2700/21171* (2013.01); *F25B 2700/21174* (2013.01); *F25B 2700/21175* (2013.01); *Y02B 30/123* (2013.01); *Y02B 30/52* (2013.01)
USPC .................................. 62/149; 62/255; 62/160

(56) References Cited

U.S. PATENT DOCUMENTS

| | | | |
|---|---|---|---|
| 2006/0048539 A1* | 3/2006 | Takechi et al. | 62/513 |
| 2006/0080989 A1* | 4/2006 | Aoki et al. | 62/324.4 |
| 2006/0185376 A1* | 8/2006 | Yoshimi et al. | 62/228.1 |
| 2009/0013700 A1* | 1/2009 | Unezaki et al. | 62/77 |
| 2009/0199581 A1* | 8/2009 | Ushijima et al. | 62/238.7 |
| 2010/0024454 A1* | 2/2010 | Kawano et al. | 62/222 |
| 2011/0000240 A1* | 1/2011 | Yamada et al. | 62/208 |
| 2011/0107780 A1* | 5/2011 | Yamaguchi et al. | 62/149 |

FOREIGN PATENT DOCUMENTS

| | | | |
|---|---|---|---|
| JP | 2006162235 A | * | 6/2006 |
| JP | 2007-163099 A | | 6/2007 |
| JP | 2008-185292 A | | 8/2008 |
| JP | 2009-14268 A | | 1/2009 |
| JP | 2010-7994 A | | 1/2010 |

OTHER PUBLICATIONS

International Search Report of corresponding PCT Application No. PCT/JP2010/000531.

* cited by examiner

HEAT PUMP SYSTEM

TECHNICAL FIELD

The present invention relates to a heat pump system, and particularly relates to a heat pump system configured so that a usage unit is connected to a heat source unit which has an accumulator.

BACKGROUND ART

A conventional air conditioning apparatus is described in Japanese Laid-open Patent Publication No. 2007-163099. In this air conditioning apparatus (heat pump system), an indoor unit (usage unit) having an indoor expansion valve (usage-side expansion valve) and a usage-side heat exchanger is connected to an outdoor unit (heat source unit) which has a compressor, a heat-source-side heat exchanger, an outdoor expansion valve (heat-source-side expansion valve), a bypass refrigerant circuit (intake return tube), and an accumulator. In this air conditioning apparatus, during air-warming operation (heating operation) in which the usage-side heat exchanger functions as a refrigerant radiator, the usage-side expansion valve connected to the outlet of the usage-side heat exchanger is controlled so that the degree of subcooling of the outlet refrigerant, which is the degree of subcooling of the refrigerant in the outlet of the usage-side heat exchanger, is equal to a predetermined target degree of subcooling of the outlet refrigerant. The accumulator in this arrangement is connected to the inlet of the compressor. The heat-source-side expansion valve is connected to the inlet of the heat-source-side heat exchanger for heating operation. The intake return tube connects the inlet of the accumulator with the portion of a liquid refrigerant tube that extends from the usage-side expansion valve to the heat-source-side expansion valve, the liquid refrigerant tube connecting the usage-side heat exchanger and the heat-source-side heat exchanger.

SUMMARY

In the conventional heat pump system described above, the liquid refrigerant tube is sometimes long, and large amount of excess refrigerant are often present in the refrigerant circuit during the heating operation.

On the other hand, control may be performed to recover refrigerant in the accumulator from the liquid refrigerant tube through the intake return tube and store the excess refrigerant in the accumulator during the heating operation.

However, in this control for using the intake return tube to recover refrigerant in the accumulator, the rate of refrigerant flowing through the intake return tube increases, thereby reducing the rate of refrigerant flowing through the heat-source-side heat exchanger, and the degree of superheat of the refrigerant in the outlet of the heat-source-side heat exchanger tends to increase. When this refrigerant having a high degree of superheat flows into the accumulator, the refrigerant in the accumulator is heated and evaporated by the heat retained by the inflowing refrigerant, and refrigerant is released into the intake of the compressor from inside the accumulator. In other words, performing control to use the intake return tube to recover refrigerant in the accumulator causes a phenomenon to occur whereby refrigerant is released from within the accumulator.

Even when control is performed for using the intake return tube to recover refrigerant in the accumulator, an unstable recovery operation is prone to occur in which recovery of refrigerant into the accumulator and release of refrigerant from the accumulator are repeated. As a result, control for stably recovering refrigerant in the accumulator is difficult to perform.

An object of the present invention is to provide a heat pump system having a configuration in which a usage unit is connected to a heat source unit which has an accumulator, wherein refrigerant can be stably recovered in the accumulator and stored as excess refrigerant during the heating operation.

A heat pump system according to a first aspect of the present invention comprises a refrigerant circuit and a controller. The refrigerant circuit is configured so that a usage unit having a usage-side expansion valve and a usage-side heat exchanger is connected to a heat source unit having a compressor for compressing a refrigerant; a heat-source-side heat exchanger; a heat-source-side expansion valve; and an accumulator which is connected to an intake of the compressor. The controller performs a heating operation for causing the usage-side heat exchanger to function as a refrigerant radiator, and for controlling the usage-side expansion valve so that during the heating operation, a degree of subcooling of the outlet refrigerant, which is the degree of subcooling of the refrigerant in an outlet of the usage-side heat exchanger, is equal to a predetermined target degree of subcooling of the outlet refrigerant. The controller also controls the heat-source-side expansion valve so that the degree of superheat of the outlet refrigerant, which is the degree of superheat of the refrigerant in an outlet of the heat-source-side heat exchanger functioning as a refrigerant evaporator, is equal to a predetermined target degree of superheat of the outlet refrigerant. The controller also performs refrigerant recovery control. In refrigerant recovery control, the target degree of superheat of the outlet refrigerant is changed so that the refrigerant in the outlet of the heat-source-side heat exchanger is wet when the usage-side expansion valve is opened to be greater than a predetermined opening degree for the start of refrigerant recovery. The change in the target degree of superheat of the outlet refrigerant is cancelled when the usage-side expansion valve is closed to be smaller than a predetermined opening degree for the end of refrigerant recovery in the state in which the target degree of superheat of the outlet refrigerant is changed.

When a refrigerant excess occurs in the refrigerant circuit during the heating operation, refrigerant is prone to accumulate in the usage-side heat exchanger functioning as a refrigerant condenser. Therefore, when the usage-side expansion valve is controlled on that the degree of subcooling of the outlet refrigerant is equal to the target degree of subcooling of the outlet refrigerant, the usage-side expansion valve operates in the opening direction, and the opening degree of the usage-side expansion valve tends to be greater than the proper range. However, when the excess refrigerant is stored in the accumulator, the amount of accumulated refrigerant decreases in the usage-side heat exchanger functioning as a refrigerant condenser. Therefore, when the usage-side expansion valve is controlled on that the degree of subcooling of the outlet refrigerant is equal to the target degree of subcooling of the outlet refrigerant, the usage-side expansion valve operates in the closing direction, and the opening degree of the usage-side expansion valve tends to decrease to the proper range.

In this heat pump system, the presence of the refrigerant excess can be determined by using the operating tendency of the usage-side expansion valve when under control so that the degree of subcooling of the outlet refrigerant is equal to the target degree of subcooling of the outlet refrigerant. In other words, in this heat pump system, it is possible to determine that the refrigerant excess has occurred by detecting astute in which the usage-side expansion valve is opened to be greater than the opening degree for the start of refrigerant recovery. In this heat pump system, it is also possible to determine that refrigerant has been stored as excess refrigerant in the accumulator by detecting a state in which the usage-side expansion valve is closed to be smaller than the opening degree for the end of refrigerant recovery.

In this heat pump system, when the usage-side expansion valve is opened to be greater than the opening degree for the start of refrigerant recovery, refrigerant recovery control is performed by using the heat-source-side expansion valve. In other words, when the heat-source-side expansion valve is controlled so that the degree of superheat of the outlet refrigerant is equal to the target degree of superheat of the outlet refrigerant, and the usage-side expansion valve is opened to be greater than the opening degree for the start of refrigerant recovery, the heat-source-side expansion valve is operated in the opening direction by changing the target degree of superheat of the outlet refrigerant so that the refrigerant in the outlet of the heat-source-side heat exchanger is wet. The wet refrigerant is thereby caused to flow into the accumulator, and refrigerant can be stably recovered in the accumulator and stored as excess refrigerant without heating and evaporating the refrigerant in the accumulator. In this heat pump system, the heat-source-side expansion valve is operated in the closing direction by cancelling the change in the target degree of superheat of the outlet refrigerant when the usage-side expansion valve is closed to be smaller than the opening degree for the end of refrigerant recovery. Refrigerant recovery control can thereby be appropriately ended.

Since the refrigerant recovery control described above is employed in this heat pump system, during the heating operation, refrigerant can be more stably recovered and stored as excess refrigerant in the accumulator than in a case in which control is employed for recovering refrigerant in the accumulator by using an intake return tube.

A heat pump system according to a second aspect of the present invention is the heat pump system according to the first aspect, wherein the controller changes the target degree of superheat of the outlet refrigerant to less than 0° C. during the refrigerant recovery control.

In this heat pump system, since the heat-source-side expansion valve is operated in the opening direction by changing the target degree of superheat of the outlet refrigerant to less than 0° C. during refrigerant recovery control, the refrigerant in the outlet of the heat-source-side heat exchanger can reliably be made wet.

A heat pump system according to a third aspect of the present invention is the heat pump system according to the second aspect, wherein the controller sets the target degree of superheat of the outlet refrigerant to 0° C. to 1° C. when not performing the refrigerant recovery control.

In this heat pump system, since the target degree of superheat of the outlet refrigerant is set to 0° C. to 1° C. and the heat-source-side expansion valve is controlled when refrigerant recovery control is not performed, a state occurs in which the refrigerant in the outlet of the heat-source-side heat exchanger is in a nearly saturated gas state, and there is minimal change in the opening degree of the heat-source-side expansion valve. The operating state is thereby stabilized during the time that refrigerant recovery control is not performed, and it is possible to more precisely determine the presence of a refrigerant excess by using the operating tendency of the usage-side expansion valve.

A heat pump system according to a fourth aspect of the present invention is the heat pump system according to any of the first through third aspects, wherein the opening degree for the end of refrigerant recovery is less than the opening degree for the start of refrigerant recovery.

In this heat pump system, since the opening degree for the end of refrigerant recovery is less than the opening degree for the start of refrigerant recovery, refrigerant can be adequately recovered in the accumulator.

A heat pump system according to a fifth aspect of the present invention is the heat pump system according to any of the first through fourth aspects, wherein the controller performs overflow prevention control with priority over the refrigerant recovery control. The overflow prevention control changes the target degree of superheat of the outlet refrigerant so that the degree of superheat of the outlet refrigerant increases when the degree of superheat of discharge refrigerant, which is the degree of superheat of refrigerant in a discharge of the compressor, is less than a predetermined lower limit discharge degree of superheat.

During the refrigerant recovery control described above, there is a risk of overflow of the refrigerant stored in the accumulator, due to such causes as overfilling of refrigerant into the refrigerant circuit. The degree of superheat of the discharge refrigerant tends to decrease when refrigerant overflows from the accumulator.

In this heat pump system, the presence of an overflow of refrigerant from the accumulator can be determined by using the tendency of the degree of superheat of the discharge refrigerant. In other words, in this heat pump system, it is possible to determine that an overflow of refrigerant from the accumulator has occurred by detecting that the degree of superheat of the discharge refrigerant is less than the lower limit discharge degree of superheat.

In this heat pump system, when the degree of superheat of the refrigerant is less than the lower limit discharge degree of superheat, overflow prevention control is performed by using the heat-source-side expansion valve, which is controlled so that the degree of superheat of the outlet refrigerant is equal to the target degree of superheat of the outlet refrigerant. In other words, when the degree of superheat of the discharge refrigerant is less than the lower limit discharge degree of superheat, by changing the target degree of superheat of the outlet refrigerant so that the degree of superheat of the outlet refrigerant increases, the heat-source-side expansion valve is operated in the closing direction. The degree of superheat of the refrigerant flowing into the accumulator is thereby increased, and refrigerant recovery control can be stopped.

Since the overflow prevention control described above is employed in this heat pump system, it is possible to prevent refrigerant from overflowing from the accumulator during refrigerant recovery control.

A heat pump system according to a sixth aspect of the present invention is the heat pump system according to any of the first through fifth aspects, wherein the controller performs refrigerant evacuation control. The refrigerant evacuation control changes the target degree of superheat of the outlet refrigerant so that the degree of superheat of the outlet refrigerant increases when the usage-side expansion valve is closed to be smaller than a predetermined opening degree for the start of refrigerant evacuation. The change in the target degree of superheat of the outlet refrigerant is cancelled when the usage-side expansion valve is opened to be greater than a predetermined opening degree for the end of refrigerant evacuation in the state in which the target degree of superheat of the outlet refrigerant is changed.

When a refrigerant deficiency occurs in the refrigerant circuit during the heating operation, refrigerant does not readily accumulate in the usage-side heat exchanger, which functions as the refrigerant condenser. Therefore, when the usage-side expansion valve is controlled so that the degree of subcooling of the outlet refrigerant is equal to a predetermined target degree of subcooling of the outlet refrigerant, the usage-side expansion valve operates in the closing direction, and the opening degree of the usage-side expansion valve tends to be less than the proper range. However, when refrigerant is evacuated from the accumulator, the refrigerant more readily accumulates in the usage-side heat exchanger functioning as the refrigerant condenser. Therefore, when the usage-side expansion valve is controlled so that the degree of subcooling of the outlet refrigerant is equal to the target degree of subcooling of the outlet refrigerant, the usage-side expansion valve operates in the opening direction, and the opening degree of the usage-side expansion valve tends to increase to the proper range.

In this heat pump system, the presence of a refrigerant excess can be determined by using the operating tendency of the usage-side expansion valve when under control so that the degree of subcooling of the outlet refrigerant is equal to the target degree of subcooling of the outlet refrigerant. In other words, in this heat pump system, it is possible to determine that a refrigerant deficiency has occurred by detecting a state in which the usage-side expansion valve is closed to be smaller than an opening degree for the start of refrigerant evacuation. In this heat pump system, it is also possible to determine that a refrigerant deficiency has been overcome by detecting a state in which the usage-side expansion valve is opened to be greater than an opening degree for the end of refrigerant evacuation.

In this heat pump system, when the usage-side expansion valve is closed to be smaller than the opening degree for the start of refrigerant evacuation, refrigerant evacuation control is performed by using the heat-source-side expansion valve, which is controlled so that the degree of superheat of the outlet refrigerant is equal to the target degree of superheat of the outlet refrigerant. In other words, when the usage-side expansion valve is closed to be smaller than the opening degree for the start of refrigerant evacuation, the heat-source-side expansion valve is operated in the closing direction by changing the target degree of superheat of the outlet refrigerant so that the degree of superheat of the outlet refrigerant increases. The degree of superheat of the refrigerant flowing into the accumulator is thereby increased, the refrigerant in the accumulator is heated and evaporated, the refrigerant stored in the accumulator is stably evacuated, and a refrigerant deficiency can be overcome. In this heat pump system, the heat-source-side expansion valve is operated in the opening direction by cancelling the change in the target degree of superheat of the outlet refrigerant when the usage-side expansion valve is opened to be greater than the opening degree for the end of refrigerant evacuation. Refrigerant evacuation control can thereby be appropriately ended.

Since the refrigerant evacuation control described above is employed in this heat pump system, when a refrigerant deficiency occurs during the heating operation, refrigerant can be evacuated from the accumulator to overcome the refrigerant deficiency.

A heat pump system according to a seventh aspect of the present invention is the heat pump system according to the sixth aspect, wherein the controller sets the target degree of superheat of the outlet refrigerant to 0° C. to 1° C. when not performing the refrigerant evacuation control.

In this heat pump system, since the target degree of superheat of the outlet refrigerant is set to 0° C. to 1° C. and the heat-source-side expansion valve is controlled when refrigerant evacuation control is not performed, a state occurs in which the refrigerant in the outlet of the heat-source-side heat exchanger is in a nearly saturated gas state, and there is minimal change in the opening degree of the heat-source-side expansion valve. The operating state is thereby stabilized during the time that refrigerant evacuation control is not performed, and it is possible to more precisely determine the presence of a refrigerant deficiency by using the operating tendency of the usage-side expansion valve.

A heat pump system according to an eighth aspect of the present invention is the heat pump system according to the seventh aspect, wherein the controller changes the target degree of superheat of the outlet refrigerant to 2° C. or higher during the refrigerant evacuation control.

In this heat pump system, by changing the target degree of superheat of the outlet refrigerant to 2° C. or higher during the refrigerant evacuation control, the heat-source-side expansion valve is operated in the closing direction, and the degree of superheat of the refrigerant in the outlet of the heat-source-side heat exchanger can therefore be reliably increased.

A heat pump system according to a ninth aspect of the present invention is the heat pump system according to any of the sixth through eighth aspects, wherein the opening degree for the start of refrigerant evacuation is less than the opening degree for the end of refrigerant evacuation.

In this heat pump system, since the opening degree for the start of refrigerant evacuation is less than the opening degree for the end of refrigerant evacuation, the refrigerant can be adequately evacuated from the accumulator.

A heat pump system according to a tenth aspect of the present invention is the heat pump system according to any of the first through ninth aspects, wherein the controller sets the heat-source-side expansion valve to an opening degree 30% or less than the maximum opening degree and sets the usage-side expansion valve to an opening degree 50% or more of the maximum opening degree thereof at the start of the heating operation.

In this heat pump system, by setting the heat-source-side expansion valve to an opening degree 30% or less of the maximum opening degree thereof at the start of the heating operation, the heat-source-side expansion valve is controlled in the opening direction. In this heat pump system, setting the usage-side expansion valve to an opening degree 50% or more of the maximum opening degree thereof at the start of the heating operation promotes evacuation of the refrigerant from the usage side heat exchanger functioning as a refrigerant condenser. Refrigerant thereby does not readily accumulate in the usage-side heat exchanger, the flow of refrigerant into the heat-source-side heat exchanger is promoted, and a stable state can be obtained in which a refrigerant excess does not readily occur in the heat pump system at the start of the heating operation.

DESCRIPTION OF EMBODIMENTS

Embodiments of the heat pump system according to the present invention will be described based on the drawings.

(1) First Embodiment

<Configuration>

—General—

Figure 1:
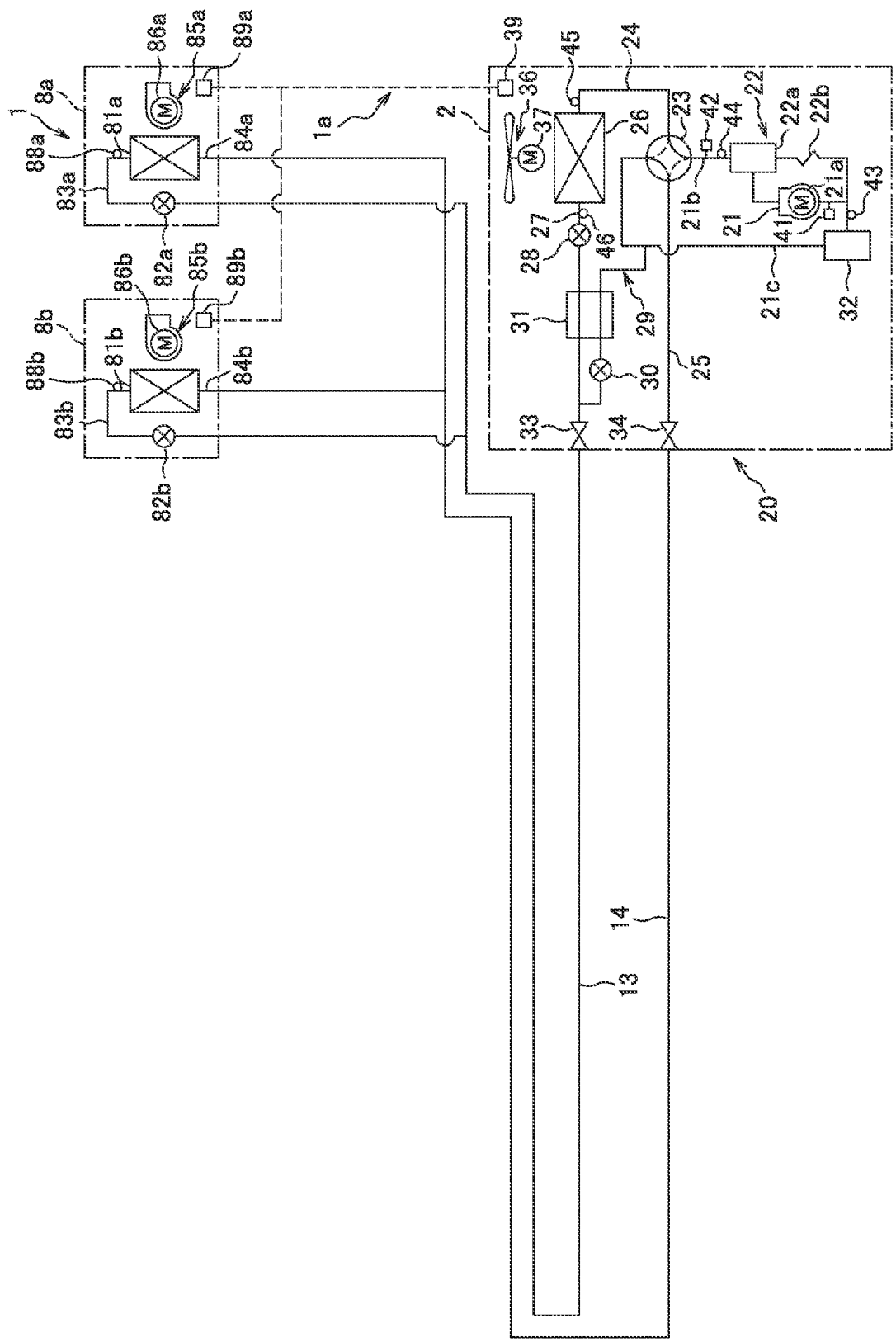
FIG. 1 is a schematic structural view showing the heat pump system according to a first embodiment of the present invention.

FIG. 1 is a schematic structural view showing the heat pump system 1 according to a first embodiment of the present invention. The heat pump system 1 is an apparatus capable of air-cooling operation as a cooling operation, air-warming operation as a heating operation, and other operation by utilizing a vapor compression heat pump cycle.

The heat pump system 1 has primarily a heat source unit 2, usage units 8a, 8b, a liquid refrigerant communication tube 13, and a gas refrigerant communication tube 14. The heat source unit 2 and the usage units 8a, 8b are connected via the refrigerant communication tubes 13, 14, thereby constituting a heat-source-side refrigerant circuit 20. The HFC-type refrigerant HFC-410A is enclosed as heat-source-side refrigerant in the heat-source-side refrigerant circuit 20.

—Heat Source Unit—

The heat source unit 2 is installed outdoors, is connected to the usage units 8a, 8b via the refrigerant communication tubes 13, 14, and constitutes a portion of the heat-source-side refrigerant circuit 20.

The heat source unit 2 has primarily a compressor 21, an oil separation mechanism 22, a switching mechanism 23, a heat-source-side heat exchanger 26, a heat-source-side expansion valve 28, an intake return tube 29, a subcooler 31, a heat-source-side accumulator 32, a liquid-side shutoff valve 33, and a gas-side shutoff valve 3.4.

The compressor 21 is a mechanism for compressing the heat-source-side refrigerant. The compressor 21 used herein is a hermetic compressor in which a rotary-type, scroll-type, or other positive-displacement compression element (not shown) housed in a casing (not shown) is driven by a compressor motor 21a which is also housed in the casing. The rotation speed (i.e., the operating frequency) of the compressor motor 21a can be varied by an inverter apparatus (not shown), and the capacity of the compressor 2.1 can thereby be controlled.

The oil separation mechanism 22 is a mechanism for separating refrigeration machine oil included in the heat-source-side refrigerant that is discharged from the compressor 21 and returning the refrigeration machine oil to the intake of the compressor 21. The oil separation mechanism 22 has primarily an oil separator 22a provided to a discharge tube 21b of the compressor 21; and an oil return tube 22b for connecting the oil separator 22a and an intake tube 21c of the compressor 21. The oil separator 22a is a device for separating refrigeration machine oil included in the heat-source-side refrigerant that is discharged from the compressor 21. The oil return tube 22b has a capillary tube, and is a refrigerant tube for returning the refrigeration machine oil separated from the heat-source-side refrigerant in the oil separator 22a to the intake tube 21c of the compressor 21.

The switching mechanism 23 is a four-way switching valve capable of switching between a heat-source-side radiating operation state in which the heat-source-side heat exchanger 26 functions as a heat-source-side refrigerant radiator, and a heat-source-side evaporating operation state in which the heat-source-side heat exchanger 26 functions as a heat-source-side refrigerant evaporator. The switching mechanism 23 is connected to the discharge tube 21b, the intake tube 21c, a first heat-source-side gas refrigerant tube 24 connected to the gas side of the heat-source-side heat exchanger 26, and a second heat-source-side gas refrigerant tube 25 connected to the gas-side shutoff valve 34. The switching mechanism 23 is capable of switching for communicating the discharge tube 21b with the first heat-source-side gas refrigerant tube 24, and communicating the second heat-source-side gas refrigerant tube 25 with the intake tube 21c (this switching corresponding to the heat-source-side radiating operation state, indicated by solid lines in the switching mechanism 23 in FIG. 1). The switching mechanism 23 is also capable of switching for communicating the discharge tube 21b with the second heat-source-side gas refrigerant tube 25, and communicating the first heat-source-side gas refrigerant tube 24 with the intake tube 21c (this switching corresponding to the heat-source-side evaporating operation state, indicated by dashed lines in the switching mechanism 23 in FIG. 1). The switching mechanism 23 is not limited to a four-way switching valve, and may be a switching mechanism configured so as to be capable of switching the same directions of heat-source-side refrigerant flow as those described above through the use of a combination of a plurality of solenoid valves or the like, for example.

The heat-source-side heat exchanger 26 is a heat exchanger for functioning as a heat-source-side refrigerant radiator or evaporator by exchanging heat between heat-source-side refrigerant and outdoor air. A heat-source-side liquid refrigerant tube 27 is connected to the liquid side of the heat-source-side heat exchanger 26, and the first heat-source-side gas refrigerant tube 24 is connected to the gas side thereof. The outdoor air for heat exchange with the heat-source-side refrigerant in the heat-source-side heat exchanger 26 is fed by a heat-source-side fan 36 which is driven by a heat-source-side fan motor 37. The rotation speed (i.e., operating frequency) of the heat-source-side fan motor 37 can be varied by an inverter apparatus (not shown), and the airflow of the heat-source-side fan 36 can thereby be controlled.

The heat-source-side expansion valve 28 is an electrically driven expansion valve for performing such functions as depressurizing the heat-source-side refrigerant flowing through the heat-source-side heat exchanger 26, and is provided to the heat-source-side liquid refrigerant tube 27.

The intake return tube 29 is a refrigerant tube for diverting a portion of the heat-source-side refrigerant flowing through the heat-source-side liquid refrigerant tube 27 and returning the diverted refrigerant to the intake of the compressor 21, and in the present embodiment, one end of the intake return tube 29 is connected to the heat-source-side liquid refrigerant tube 27, and the other end is connected to the intake tube 21c. An intake return expansion valve 30, the opening degree of which can be controlled, is provided to the intake return tube 29. The intake return expansion valve 30 is composed of an electrically driven expansion valve.

The subcooler 31 is a heat exchanger for exchanging heat between the heat-source-side refrigerant flowing through the heat-source-side liquid refrigerant tube 27 and the heat-source-side refrigerant flowing through the intake return tube 29 (more specifically, the heat-source-side refrigerant that has been depressurized by the intake return expansion valve 30).

The heat-source-side accumulator 32 is provided to the intake tube 21c, and is a container for temporarily storing the heat-source-side refrigerant circulated through the heat-source-side refrigerant circuit 20 before the heat-source-side refrigerant is drawn into the compressor 21 from the intake tube 21c.

The liquid-side shutoff valve 33 is a valve provided at the connection between the heat-source-side liquid refrigerant tube 27 and the liquid refrigerant communication tube 13. The gas-side shutoff valve 34 is a valve provided at the connection between the second heat-source-side gas refrigerant tube 25 and the gas refrigerant communication tube 14.

Various sensors are provided to the heat source unit 2. Specifically, the heat source unit 2 is provided with an intake pressure sensor 41, a discharge pressure sensor 42, an intake temperature sensor 43, a discharge temperature sensor 44, a heat-source-side heat exchange gas-side temperature sensor 45, and a heat-source-side heat exchange liquid-side temperature sensor 46. The intake pressure sensor 41 is a pressure sensor for detecting an intake pressure Ps1, which is the pressure of the heat-source-side refrigerant in the intake of the compressor 21. The discharge pressure sensor 42 is a pressure sensor for detecting a discharge pressure Pd1, which is the pressure of the heat-source-side refrigerant in the discharge of the compressor 21. The intake temperature sensor 43 is a temperature sensor for detecting an intake temperature Ts1, which is the temperature of the heat-source-side refrigerant in the intake of the compressor 21. The discharge temperature sensor 44 is a temperature sensor for detecting a discharge temperature Td1, which is the temperature of the heat-source-side refrigerant in the discharge of the compressor 21. The heat-source-side heat exchange gas-side temperature sensor 45 is a temperature sensor for detecting a heat-source-side heat exchange gas-side temperature Thg, which is the temperature of the heat-source-side refrigerant on the gas side of the heat-source-side heat exchanger 26. The heat-source-side heat exchange liquid-side temperature sensor 46 is a temperature sensor for detecting a heat-source-side heat exchange liquid-side temperature Th1, which is the temperature of the heat-source-side refrigerant on the liquid side of the heat-source-side heat exchanger 26. The heat source unit 2 has a heat-source-side controller 39 for controlling the operation of each component of the heat source unit 2. The heat-source-side controller 39 has a microcomputer and/or memory and other components for controlling the heat source unit 2, and is configured so as to be capable of exchanging control signals and the like with usage-side controllers 89a, 89b of the usage units 8a, 8b described hereinafter.

—Liquid Refrigerant Communication Tube—

The liquid refrigerant communication tube 13 is connected to the heat-source-side liquid refrigerant tube 27 via the liquid-side shutoff valve 33. The liquid refrigerant communication tube 13 is a refrigerant tube capable of directing the heat-source-side refrigerant to the outside of the heat source unit 2 from the outlet of the heat-source-side heat exchanger 26 which functions as a heat-source-side refrigerant radiator when the switching mechanism 23 is in the heat-source-side radiating operation state. The liquid refrigerant communication tube 13 is also a refrigerant tube capable of introducing the heat-source-side refrigerant from outside the heat source unit 2 into the inlet of the heat-source-side heat exchanger 26 which functions as a heat-source-side refrigerant evaporator when the switching mechanism 23 is in the heat-source-side evaporating operation state.

—Gas Refrigerant Communication Tube—

The gas refrigerant communication tube 14 is connected to the second heat-source-side gas refrigerant tube 25 via the gas-side shutoff valve 34. The gas refrigerant communication tube 14 is a refrigerant tube capable of introducing the heat-source-side refrigerant into the intake of the compressor 21 from the outside of the heat source unit 2 when the switching mechanism 23 is in the heat-source-side radiating operation state. The gas refrigerant communication tube 14 is also a refrigerant tube capable of directing the heat-source-side refrigerant to the outside of the heat source unit 2 from the discharge of the compressor 21 when the switching mechanism 23 is in the heat-source-side evaporating operation state.

—Usage Units—

The usage units 8a, 8b are installed indoors, are connected to the heat source unit 2 via the refrigerant communication tubes 13, 14, and constitute a portion of the heat-source-side refrigerant circuit 20. The usage unit 8b has the same configuration as the usage unit 8a. Therefore, only the configuration of the usage unit 8a will be described. To refer to the configuration of the usage unit 8b, the subscript "b" is added instead of "a" to the reference signs for indicating the components of the usage unit 8a, and the components of the usage unit 8b will not be described.

The usage unit 8a has primarily a usage-side heat exchanger 81a and a usage-side expansion valve 82a.

The usage-side heat exchanger 81a is a heat exchanger for functioning as a heat-source-side refrigerant radiator or evaporator by exchanging heat between the heat-source-side refrigerant and the indoor air, a usage-side liquid refrigerant tube 83a is connected to the liquid side of the usage-side heat exchanger 81a, and a usage-side gas refrigerant tube 84a is connected to the gas side thereof. The liquid refrigerant communication tube 13 is connected to the usage-side liquid refrigerant tube 83a, and the gas refrigerant communication tube 14 is connected to the usage-side gas refrigerant tube 84a. The indoor air for exchanging heat with the heat-source-side refrigerant in the usage-side heat exchanger 81a is fed by a usage-side fan 85a which is driven by a usage-side fan motor 86a.

The usage-side expansion valve 82a is an electrically driven expansion valve whereby the flow rate of heat-source-side refrigerant flowing through the usage-side heat exchanger 81a can be varied by controlling the opening degree of the usage-side expansion valve 82a, and the usage-side expansion valve 82a is provided to the usage-side liquid refrigerant tube 83a.

The usage unit 8a is thereby configured so that the usage-side heat exchanger 81a can be caused to function as an evaporator of the heat-source-side refrigerant introduced from the liquid refrigerant communication tube 13 when the switching mechanism 23 is in the heat-source-side radiating operation state. At this time, air-cooling operation can be performed as a cooling operation in which the heat-source-side refrigerant evaporated in the usage-side heat exchanger 81a is directed out to the gas refrigerant communication tube 14, and the indoor air is cooled by the evaporation of the heat-source-side refrigerant in the usage-side heat exchanger 81a. The usage unit 8a is also configured so that the usage-side heat exchanger 81a can be caused to function as a radiator of the heat-source-side refrigerant introduced from the gas refrigerant communication tube 14 when the switching mechanism 23 is in the heat-source-side evaporating operation state. At this time, air-warming operation can be performed as a heating operation in which the heat-source-side refrigerant radiated in the usage-side heat exchanger 81a is directed out to the liquid refrigerant communication tube 13, and the indoor air is heated by the radiating of the heat-source-side refrigerant in the usage-side heat exchanger 81a.

Various sensors are provided to the usage unit 8a. Specifically, a usage-side heat exchange liquid-side temperature sensor 88a is provided to the usage unit 8a. The usage-side heat exchange liquid-side temperature sensor 88a is a temperature sensor for detecting a usage-side heat exchange liquid-side temperature Tu1, which is the temperature of the heat-source-side refrigerant on the liquid side of the usage-side heat exchanger 81a. The usage unit 8a also has a usage-side controller 89a for controlling the operation of each component of the usage unit 8a. The usage-side controller 89a has a microcomputer and/or memory and other components for controlling the usage unit 8a, and is configured so as to be capable of exchanging control signals and the like with a remote control (not shown), and exchanging control signals and the like with the heat-source-side controller 39 of the heat source unit 2.

A controller 1a for controlling the operation of the heat pump system 1 is composed of the usage-side controllers 89a, 89b and the heat-source-side controller 39, and the controller 1a is configured to perform the operations and/or various types of control described below.

<Operation>

The operation of the heat pump system 1 will next be described.

Operation of the heat pump system 1 includes an air-warming operation mode for performing only the air-warming operation (heating operation) of the usage unit 8a and/or usage unit 8b, and an air-cooling operation mode for performing only the air-cooling operation (cooling operation) of the usage unit 8a and/or usage unit 8b.

—Air-warming Operation Mode—

In the case of performing only the air-warming operation of the usage unit 8a and/or usage unit 8b, the switching mechanism 23 is switched to the heat-source-side evaporating operation state (indicated by dashed lines in the switching mechanism 23 in FIG. 1) in the heat-source-side refrigerant circuit 20. The intake return expansion valve 30 is also closed.

In the heat-source-side refrigerant circuit 20 in such a state, the heat-source-side refrigerant at a low pressure in the refrigeration cycle is drawn into the compressor 21 through the intake tube 21c and compressed to a high pressure in the refrigeration cycle, and subsequently discharged to the discharge tube 21b. In the oil separator 22a, the refrigeration machine oil is separated from the high-pressure heat-source-side refrigerant discharged to the discharge tube 21b. The refrigeration machine oil separated from the heat-source-side refrigerant in the oil separator 22a is returned to the intake tube 21c through the oil return tube 22b. The high-pressure heat-source-side refrigerant from which the refrigeration machine oil has been separated is sent from the heat source unit 2 to the gas refrigerant communication tube 14 through the switching mechanism 23, the second heat-source-side gas refrigerant tube 25, and the gas-side shutoff valve 34.

The high-pressure heat-source-side refrigerant sent to the gas refrigerant communication tube 14 is sent to the usage units 8a, 8b (the usage units 8a, 8b both being described herein as performing the air-warming operation). The high-pressure heat-source-side refrigerant sent to the usage units 8a, 8b is sent to the usage-side heat exchangers 81a, 81b through the usage-side gas refrigerant tubes 84a, 84b. The high-pressure heat-source-side refrigerant sent to the usage-side heat exchangers 81a, 81b is heat-exchanged and radiated in the usage-side heat exchangers 81a, 81b with the indoor air fed by the usage-side fans 85a, 85b, and indoor air warming is thereby performed. The high-pressure heat-source-side refrigerant radiated in the usage-side heat exchangers 81a, 81b is sent from the usage units 8a, 8b to the liquid refrigerant communication tube 13 through the usage-side expansion valves 82a, 82b and the usage-side liquid refrigerant tubes 83a, 83b.

The heat-source-side refrigerant sent to the liquid refrigerant communication tube 13 is sent to the heat source unit 2. The heat-source-side refrigerant sent to the heat source unit 2 is sent to the subcooler 31 through the liquid-side shutoff valve 33. Since the heat-source-side refrigerant does not flow to the intake return tube 29, the heat-source-side refrigerant sent to the subcooler 31 is sent to the heat-source-side expansion valve 28 without being heat-exchanged. The heat-source-side refrigerant sent to the heat-source-side expansion valve 28 is depressurized in the heat-source-side expansion valve 28 to a low-pressure gas-liquid two-phase state, and sent to the heat-source-side heat exchanger 26 through the heat-source-side liquid refrigerant tube 27. The low-pressure heat-source-side refrigerant sent to the heat-source-side heat exchanger 26 is heat-exchanged and evaporated in the heat-source-side heat exchanger 26 with the outdoor air fed by the heat-source-side fan 36. The low-pressure heat-source-side refrigerant evaporated in the heat-source-side heat exchanger 26 is sent to the heat-source-side accumulator 32 through the first heat-source-side gas refrigerant tube 24 and the switching mechanism 23. The low-pressure heat-source-side refrigerant sent to the heat-source-side accumulator 32 is again drawn into the compressor 21 through the intake tube 21c.

The operations in the air-warming operation mode for performing only the air-warming operation of the usage unit 8a and/or usage unit 8b are thus performed.

—Air-cooling Operation Mode—

In the case of performing only the air-cooling operation of the usage unit 8a and/or usage unit 8b, the switching mechanism 23 is switched to the heat-source-side radiating operation state (indicated by solid lines in the switching mechanism 23 in FIG. 1) in the heat-source-side refrigerant circuit 20. The usage units 8a, 8b are both described herein as performing the air-cooling operation.

In the heat-source-side refrigerant circuit 20 in such a state, the heat-source-side refrigerant at the low pressure in the refrigeration cycle is drawn into the compressor 21 through the intake tube 21c and compressed to the high pressure in the refrigeration cycle, and subsequently discharged to the discharge tube 21b. In the oil separator 22a, the refrigeration machine oil is separated from the high-pressure heat-source-side refrigerant discharged to the discharge tube 21b. The refrigeration machine oil separated from the heat-source-side refrigerant in the oil separator 22a is returned to the intake tube 21c through the oil return tube 22b. The high-pressure heat-source-side refrigerant from which the refrigeration machine oil has been separated is sent to the heat-source-side heat exchanger 26 through the switching mechanism 23 and the first heat-source-side gas refrigerant tube 24. The high-pressure heat-source-side refrigerant sent to the heat-source-side heat exchanger 26 is heat-exchanged and radiated in the heat-source-side heat exchanger 26 with the outdoor air fed by the heat-source-side fan 36. The high-pressure heat-source-side refrigerant radiated in the heat-source-side heat exchanger 26 is sent to the subcooler 31 through the heat-source-side expansion valve 28. The heat-source-side refrigerant sent to the subcooler 31 is heat-exchanged with the heat-source-side refrigerant diverted to the intake return tube 29 from the heat-source-side liquid refrigerant tube 27, and is cooled to a subcooled state. The heat-source-side refrigerant flowing through the intake return tube 29 is returned to the intake tube 21c. The heat-source-side refrigerant cooled in the subcooler 31 is sent from the heat source unit 2 to the liquid refrigerant communication tube 13 through the heat-source-side liquid refrigerant tube 27 and the liquid-side shutoff valve 33.

The high-pressure heat-source-side refrigerant sent to the liquid refrigerant communication tube 13 is sent to the usage units 8a, 8b. The high-pressure heat-source-side refrigerant sent to the usage units 8a, 8b is sent to the usage-side expansion valves 82a, 82b. The high-pressure heat-source-side refrigerant sent to the usage-side expansion valves 82a, 82b is depressurized in the usage-side expansion valves 82a, 82b to a low-pressure gas-liquid two-phase state, and sent to the usage-side heat exchangers 81a, 81b through the usage-side liquid refrigerant tubes 83a, 83b. The low-pressure heat-source-side refrigerant sent to the usage-side heat exchangers 81a, 81b is heat-exchanged and evaporated in the usage-side heat exchangers 81a, 81b with the indoor air fed by the usage-side fans 85a, 85b, and indoor air cooling is thereby performed. The low-pressure heat-source-side refrigerant evaporated in the usage-side heat exchangers 81a, 81b is sent from the usage units 8a, 8b to the gas refrigerant communication tube 14 through the usage-side gas refrigerant tubes 84a, 84b.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 32 through the gas-side shutoff valve 34, the second heat-source-side gas refrigerant tube 25, and the switching mechanism 23. The low-pressure heat-source-side refrigerant sent to the heat-source-side accumulator 32 is again drawn into the compressor 21 through the intake tube 21c.

The operations in the air-cooling operation mode fir performing only the air-cooling operation of the usage unit 8a and/or usage unit 8b are thus performed.

—Control of the Usage-Side Expansion Valve in the Heating Operation—

Control of the usage-side expansion valves 82a, 82b in the air-warming operation as the abovementioned heating operation will be described.

The controller 1a controls the usage-side expansion valves 82a, 82b so that the degree of subcooling SCu of the outlet refrigerant, which is the degree of subcooling of the heat-source-side refrigerant in the outlets of the usage-side heat exchangers 81a, 81b functioning as heat-source-side refrigerant radiators is equal to a predetermined target degree of subcooling SCus of the outlet refrigerant. The degree of subcooling SCu of the outlet refrigerant herein is obtained by converting the discharge pressure Pd1 to a saturation temperature value corresponding to the condensation temperature Tc, and subtracting the usage-side heat exchange liquid-side temperature Tu1 from the saturation temperature value of the heat-source-side refrigerant. Although not adopted herein, a configuration may be adopted in which a temperature sensor for detecting the refrigerant temperature corresponding to the condensation temperature Tc may be provided to the usage-side heat exchangers 81a, 81b, and the degree of subcooling SCu of the outlet refrigerant may be obtained by subtracting the usage-side heat exchange liquid-side temperature Tu1 from the detected refrigerant temperature.

Through such control (hereinafter referred to simply as "subcooling degree control") of the usage-side expansion valves 82a, 82b, the flow rate of the heat-source-side refrigerant flowing through the usage-side heat exchangers 81a, 81b is adjusted.

—Control in Response to Refrigerant Excess and/or Refrigerant Deficiency—

Figure 2:
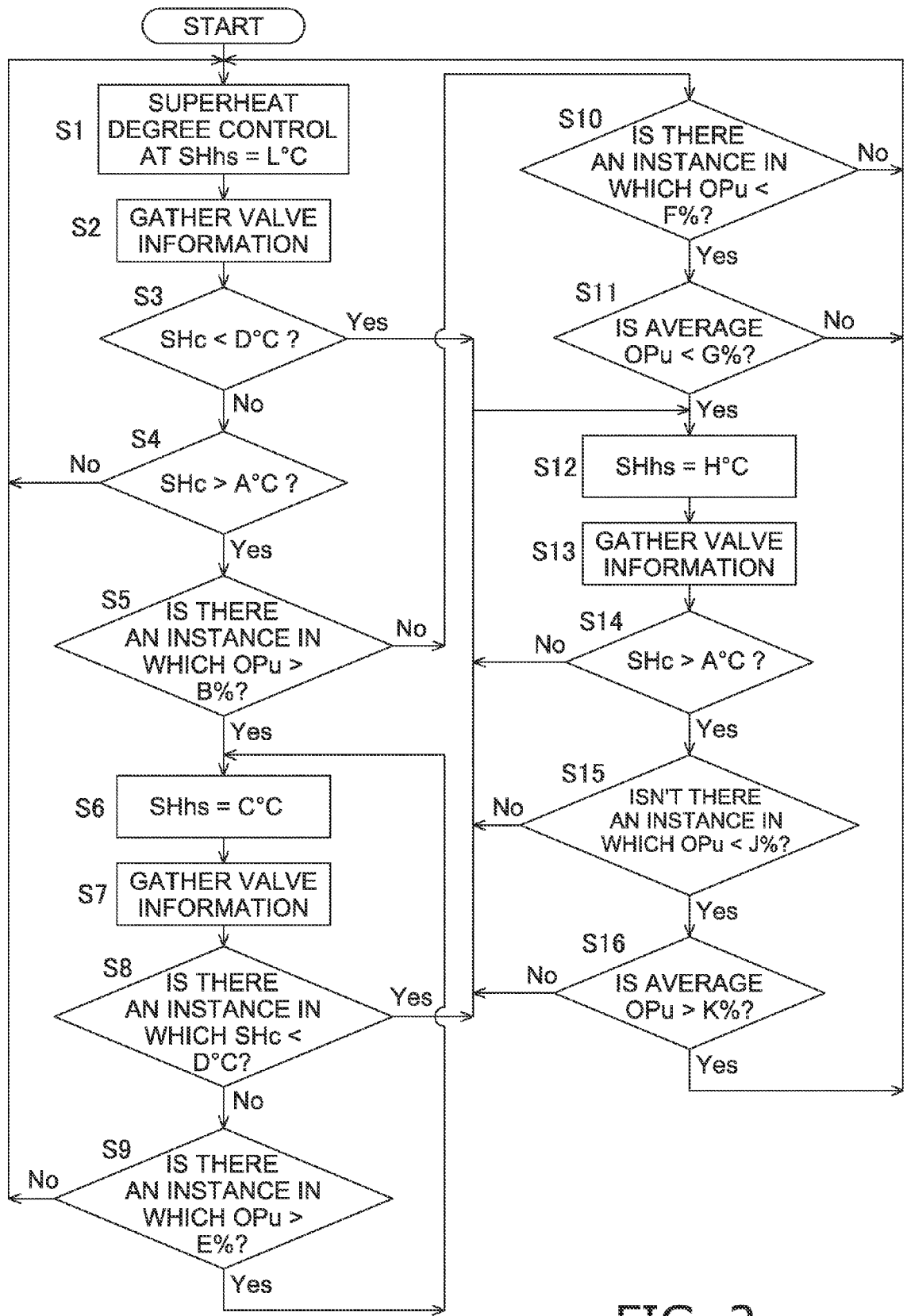
FIG. 2 is a flowchart showing refrigerant recovery control, refrigerant evacuation control, and overflow prevention control.

In the heat pump system 1, control is performed for stably recovering or evacuating heat-source-side refrigerant in the heat-source-side accumulator 32 when there is an excess and/or deficiency of refrigerant in the heat-source-side refrigerant circuit 20 during air-warming operation as the heating operation described above. Control in response to refrigerant excess and/or deficiency will be described using FIG. 2.

First, the controller 1a controls the heat-source-side expansion valve 28 so that the degree of superheat SHh of the outlet refrigerant, which is the degree of superheat of the heat-source-side refrigerant in the outlet of the heat-source-side heat exchanger 26 functioning as a heat-source-side refrigerant evaporator, is equal to a predetermined target degree of superheat SHhs of the outlet refrigerant (step S1). The degree of superheat SHh of the outlet refrigerant herein is obtained by converting the intake pressure Ps1 to a saturation temperature value corresponding to the evaporation temperature Te, and subtracting the saturation temperature value of the heat-source-side refrigerant from the heat-source-side heat exchange gas-side temperature Thg. Although not adopted herein, a configuration may be adopted in which the heat-source-side heat exchange liquid-side temperature Th1 is assumed to correspond to the evaporation temperature Te, and the degree of superheat SHh of the outlet refrigerant is obtained by subtracting the heat-source-side heat exchange liquid-side temperature Th1 from the heat-source-side heat exchange gas-side temperature Mg. The target degree of superheat SHhs of the outlet refrigerant is set to 1° C. The value of L° C. herein is 0° C. to 1° C. A state thereby occurs in which the heat-source-side refrigerant in the outlet of the heat-source-side heat exchanger 26 is in a nearly saturated gas state, and there is minimal change in the opening degree of the heat-source-side expansion valve 28.

Through such control (hereinafter referred to simply as "superheating degree control") of the heat-source-side expansion valve 28, the temperature of the heat-source-side refrigerant in the outlet of the heat-source-side heat exchanger 26 is adjusted.

The controller 1a then obtains the opening degree OPu and other valve information of the usage-side expansion valves 82a, 82b (step S2). The opening degree OPu of the usage-side expansion valves 82a, 82b herein is expressed in terms of a maximum opening degree of the usage-side expansion valves 82a, 82b of 100%.

The controller 1a then determines whether the degree of superheat SHc of the discharge refrigerant, which is the degree of superheat of the heat-source-side refrigerant in the discharge of the heat-source-side compressor 21, is less than a predetermined lower limit discharge degree of superheat SHm (step S3). The degree of superheat SHe of the discharge refrigerant herein is obtained by converting the discharge pressure Pd1 to a saturation temperature value corresponding to the condensation temperature Tc, and subtracting the saturation temperature value of the heat-source-side refrigerant from the discharge temperature Td1. The lower limit discharge degree of superheat SHm is set to D° C. The value of D herein is set to the temperature at which there is a risk of overflow of the heat-source-side refrigerant stored in the heat-source-side accumulator 32. When the heat-source-side refrigerant overflows from the heat-source-side accumulator 32, the degree of superheat SHc of the discharge refrigerant tends to decrease. In other words, in the decision made in step S3, the tendency of the degree of superheat SHe of the discharge refrigerant such as described above is used to determine whether an overflow of the heat-source-side refrigerant from the heat-source-side accumulator 32 has occurred. In step S3, when a decision is made that the degree of superheat SHc of the discharge refrigerant is less than the lower limit discharge degree of superheat SHm, the process transitions to step S12, and when a decision is made that the degree of superheat SHc of the discharge refrigerant is not less than the lower limit discharge degree of superheat SHm, the process transitions to step S4.

The controller 1a then determines whether the degree of superheat SHc of the discharge refrigerant is larger than a predetermined reference discharge degree of superheat SHs (step S4). The reference discharge degree of superheat SHs herein is set to A° C. The value of A is set to a temperature at which there is no risk of wet compression occurring in the heat-source-side compressor 21. The decision made in step S3 above can sometimes double as a decision as to whether wet compression is occurring in the compressor 21, but it is not preferred that the target degree of superheat SHhs of the outlet refrigerant be reduced in step S6 (described hereinafter) to the point that there is a risk of wet compression occurring in the heat-source-side compressor 21. The decision of step S4 is therefore made. When a decision is made in step S4 that the degree of superheat SHc of the discharge refrigerant is larger than the reference discharge degree of superheat SHs, the process transitions to step S5, and when a decision is made that the degree of superheat SHc of the discharge refrigerant is not larger than the reference discharge degree of superheat SHs, the process returns to step S1.

The controller 1a then determines whether any of the usage-side expansion valves 82a, 82b has an opening degree OPu greater than a predetermined opening degree OPcs for the start of refrigerant recovery (step S5). The opening degree OPcs for the start of refrigerant recovery herein is set to B %. The value of B is set to an opening degree greater than the proper range of the opening degree OPu of the usage-side expansion valves 82a, 82b under subcooling degree control. When a refrigerant excess occurs in the heat-source-side refrigerant circuit 20 during air-warming operation, the heat-source-side refrigerant readily accumulates in the usage-side heat exchangers 81a, 81b functioning as heat-source-side refrigerant condensers. The usage-side expansion valves 82a, 82b under subcooling degree control are therefore operated in the opening direction, and the opening degree OPu of the usage-side expansion valves tends to increase to be greater than the proper range. In other words, in the decision made in step S5, the operating tendency of the usage-side expansion valves 82a, 82b under the subcooling degree control such as described above is used to determine whether a refrigerant excess has occurred. When a decision is made in step S5 that there is a usage-side expansion valve 82a, 82b having an opening degree OPu greater than the opening degree OPcs for the start of refrigerant recovery, the process transitions to step S6, and when a decision is made that there is not a usage-side expansion valve 82a, 82b having an opening degree OPu greater than the opening degree OPcs for the start of refrigerant recovery, the process transitions to step S10.

The controller 1a then changes the target degree of superheat Stills of the outlet refrigerant so that the heat-source-side refrigerant in the outlet of the heat-source-side heat exchanger 26 is wet (step S6). The target degree of superheat SHhs of the outlet refrigerant herein is changed to a value C° C. less than L° C. The value C° C. is a temperature less than 0° C. The heat-source-side expansion valve 28 is thereby operated in the opening direction, and the heat-source-side refrigerant flows into the heat-source-side accumulator 32 while still wet. The heat-source-side refrigerant can then be stably recovered and stored as excess refrigerant in the heat-source-side accumulator 32 without being heated and evaporated in the heat-source-side accumulator 32.

The controller 1a then acquires the opening degree OPu and other valve information of the usage-side expansion valves 82a, 82b, the same as in step S2 (step S7).

The controller 1a then determines whether the degree of superheat SHc of the discharge refrigerant, which is the degree of superheat of the heat-source-side refrigerant in the discharge of the heat-source-side compressor 21, is less than the predetermined lower limit discharge degree of superheat SHm, the same as in step S3 (step S8). In step S8, when a decision is made that the degree of superheat SHc of the discharge refrigerant is less than the lower limit discharge degree of superheat SHm, the process transitions to step S12, and when a decision is made that the degree of superheat SHc of the discharge refrigerant is not less than the lower limit discharge degree of superheat SHm, the process transitions to step S9.

The controller 1a then determines whether any of the usage-side expansion valves 82a, 82b has an opening degree OPu greater than a predetermined opening degree OPce for the end of refrigerant recovery (step S9). The opening degree OPce for the end of refrigerant recovery herein is set to E %. The value of E is set to an opening degree less than the opening degree OPcs for the start of refrigerant recovery (B % herein). The usage-side expansion valves 82a, 82b under the subcooling degree control are therefore operated in the closing direction, and the opening degree OPu of the usage-side expansion valves 82a, 82b tends to decrease to the proper range. The value of E is set within the proper range of the opening degree OPu of the usage-side expansion valves 82a, 82b under the subcooling degree control. In other words, in the decision made in step S9, the operating tendency of the usage-side expansion valves 82a, 82b under the subcooling degree control such as described above is used to determine whether a refrigerant excess has occurred. When a decision is made in step S9 that there is a usage-side expansion valve 82a, 82b having an opening degree OPu greater than the opening degree OPce for the end of refrigerant recovery, it is assumed that recovery of the heat-source-side refrigerant into the heat-source-side accumulator 32 is not completed, the process returns to step S6, a state is maintained in which the target degree of superheat SHhs of the outlet refrigerant is changed to C° C., and recovery of the heat-source-side refrigerant into the heat-source-side accumulator 32 is continued. When a decision is made in step S9 that there is not a usage-side expansion valve 82a, 82b having an opening degree OPu greater than the opening degree OPce for the end of refrigerant recovery, the process returns to step S1, and the change in the target degree of superheat Stills of the outlet refrigerant is cancelled (i.e., the target degree of superheat SHhs of the outlet refrigerant is returned from C° C. to L° C.).

Through steps S1 through S9 such as described above, it is possible to perform refrigerant recovery control for stably recovering the heat-source-side refrigerant as excess refrigerant in the heat-source-side accumulator 32. In other words, the refrigerant recovery control changes the target degree of superheat SHhs of the outlet refrigerant so that the heat-source-side refrigerant in the outlet of the heat-source-side heat exchanger 26 is wet when the usage-side expansion valves 82a, 82h are opened to be greater than the opening degree OPcs for the start of refrigerant recovery. The refrigerant recovery control also cancels the change in the target degree of superheat SHhs of the outlet refrigerant when the usage-side expansion valves 82a, 82b are closed to be smaller than the opening degree OPee for the end of refrigerant recovery in the state in which the target degree of superheat SHhs of the outlet refrigerant is changed.

When a decision is made in step S5 that there is not a usage-side expansion valve 82a, 82b having an opening degree OPu greater than the opening degree OPcs for the start of refrigerant recovery (i.e., there is no need for refrigerant recovery control), the controller 1a transitions the process to step S10. The controller 1a then determines whether any of the usage-side expansion valves 82a, 82b has an opening degree OPu less than a predetermined opening degree OPes for the start of refrigerant evacuation (step S10). The opening degree OPes for the start of refrigerant evacuation herein is set to F %. The value of F is set to an opening degree less than the proper range of the opening degree OPu of the usage-side expansion valves 82a, 82b under the subcooling degree control. When a refrigerant deficiency occurs in the heat-source-side refrigerant circuit 20 during air-warming operation, the heat-source-side refrigerant does not readily accumulate in the usage-side heat exchangers 81a, 81h functioning as heat-source-side refrigerant condensers. The usage-side expansion valves 82a, 82b under the subcooling degree control are therefore operated in the closing direction, and the opening degree OPu of the usage-side expansion valves tends to decrease to be smaller than the proper range. In other words, in the decision made in step S10, the operating tendency of the usage-side expansion valves 82a, 82b under the subcooling degree control such as described above is used to determine whether a refrigerant deficiency has occurred. When a decision is made in step S10 that there is a usage-side expansion valve 82a, 82b having an opening degree OPu less than the opening degree OPes for the start of refrigerant evacuation, the process transitions to step S11, and when a decision is made that there is not a usage-side expansion valve 82a, 82b having an opening degree OPu less than the opening degree OPes for the start of refrigerant evacuation, the process returns to step S1.

The controller 1a then determines whether the average opening degree OPm of the usage-side expansion valves 82a, 82b is less than a predetermined average opening degree OPmes for the start of refrigerant evacuation (step S11). The average opening degree OPmes for the start of refrigerant evacuation herein is set to 0%. The value of (1 is set to an opening degree which is based on the opening degree OPes for the start of refrigerant evacuation in step S10. When a decision is made in step S11 that the average opening degree OPm is less than the average opening degree OPmes for the start of refrigerant evacuation, the process transitions to step S12, and when a decision is made that the average opening degree OPm is not less than the average opening degree OPmes for the start of refrigerant evacuation, the process returns to step S1.

The controller 1a then changes the target degree of superheat SHhs of the outlet refrigerant so that the degree of superheat SHh of the outlet refrigerant increases (step S12). The target degree of superheat Stills of the outlet refrigerant herein is changed to 1-1° C., which is greater than L° C. The value of 1-1° C. is a temperature 2° C. or higher. The heat-source-side expansion valve 28 is thereby operated in the closing direction, and the heat-source-side refrigerant flows into the heat-source-side accumulator 32 at a high degree of superheat. The heat-source-side refrigerant in the heat-source-side accumulator 32 is heated and evaporated, the heat-source-side refrigerant stored in the heat-source-side accumulator 32 is stably evacuated, and the refrigerant deficiency can be overcome.

The controller 1a then acquires the opening degree OPu and other valve information of the usage-side expansion valves 82a, 82b, the same as in steps S2 and S7 (step S13).

The controller 1a then determines whether the degree of superheat SHc of the discharge refrigerant is greater than the reference discharge degree of superheat SHs, the same as in step S4 (step S14). In a case in which the determination of step S14 is not made, the change whereby the target degree of superheat SHhs of the outlet refrigerant is increased in step S12 is cancelled when the determination conditions of steps S15 and S16 described hereinafter are satisfied. The degree of superheat of the heat-source-side refrigerant drawn into the heat-source-side compressor 21 then decreases, and there is therefore a risk of wet compression in the heat-source-side compressor 21. The determination of step S14 is therefore made. When a decision is made in step S14 that the degree of superheat SHc of the discharge refrigerant is greater than the reference discharge degree of superheat SHs, the process transitions to step S15, and when a decision is made that the degree of superheat SHc of the discharge refrigerant is not greater than the reference discharge degree of superheat SHs, the process returns to step S12.

The controller 1a then determines whether any of the usage-side expansion valves 82a, 82b has an opening degree OPu less than a predetermined opening degree OPee for the end of refrigerant evacuation (step S15). The opening degree OPee for the end of refrigerant evacuation herein is set to J %. The value of J is set to an opening degree greater than the opening degree OPes for the start of refrigerant evacuation (F % herein). Continuing to step S15, the controller 1a also determines whether the average opening degree OPm of the usage-side expansion valves 82a, 82b is greater than a predetermined average opening degree OPmee for the end of refrigerant evacuation (step S16). The average opening degree OPmee for the end of refrigerant evacuation herein is set to K %. The value of K is set to an opening degree which is based on the opening degree OPee for the end of refrigerant evacuation in step S15. When a decision is made in steps S15 and S16 that there is a usage-side expansion valve 82a, 82b having an opening degree OPu less than the opening degree OPee for the end of refrigerant evacuation, or when a decision is made that the average opening degree OPm is not greater than the average opening degree OPmee for the end of refrigerant evacuation, it is assumed that evacuation of the heat-source-side refrigerant from the heat-source-side accumulator 32 is not completed, the process returns to step S12, the state in which the target degree of superheat SHhs of the outlet refrigerant is changed to H° C. is maintained, and evacuation of the heat-source-side refrigerant from the heat-source-side accumulator 32 is continued. When a decision is made in steps S15 and S16 that there is no usage-side expansion valve 82a, 82b having an opening degree OPu less than the opening degree OPee for the end of refrigerant evacuation, and when a decision is made that the average opening degree OPm is greater than the average opening degree OPmee for the end of refrigerant evacuation, the process returns to step S1, and the change in the target degree of superheat SHhs of the outlet refrigerant is cancelled (i.e., the target degree of superheat SHhs of the outlet refrigerant is returned from H° C. to L° C.).

Through steps S10 through S16 such as described above, it is possible to perform refrigerant evacuation control for stably evacuating the heat-source-side refrigerant from the heat-source-side accumulator 32 and overcoming a refrigerant deficiency. In other words, the refrigerant evacuation control changes the target degree of superheat SHhs of the outlet refrigerant so that the degree of superheat Still of the outlet refrigerant increases when the usage-side expansion valves 82a, 82b are closed to be smaller than the opening degree OPes for the start of refrigerant evacuation. The refrigerant evacuation control also cancels the change in the target degree of superheat SHhs of the outlet refrigerant when the usage-side expansion valves 82a, 82b are opened to be greater than the opening degree OPee for the end of refrigerant evacuation in the state in which the target degree of superheat SHhs of the outlet refrigerant is changed.

When a decision is made in steps S3 and S8 that the degree of superheat SHc of the discharge refrigerant is less than the lower limit discharge degree of superheat SHm, it is assumed that there is a risk of overflow of the refrigerant stored in the heat-source-side accumulator 32 due to overfilling of refrigerant in the heat-source-side refrigerant circuit 20 or another cause, the controller 1a transitions to step S12, and steps S12 through S16 described above are performed. In this configuration, overflow prevention control that is the same as the refrigerant evacuation control described above is performed with priority over the refrigerant recovery control described above. In other words, the overflow prevention control changes the target degree of superheat SHhs of the outlet refrigerant so that the degree of superheat SHh of the outlet refrigerant increases when the degree of superheat SHc of the discharge refrigerant is less than the lower limit discharge degree of superheat SHm.

—Control at the Start of Heating Operation—

Figure 3:
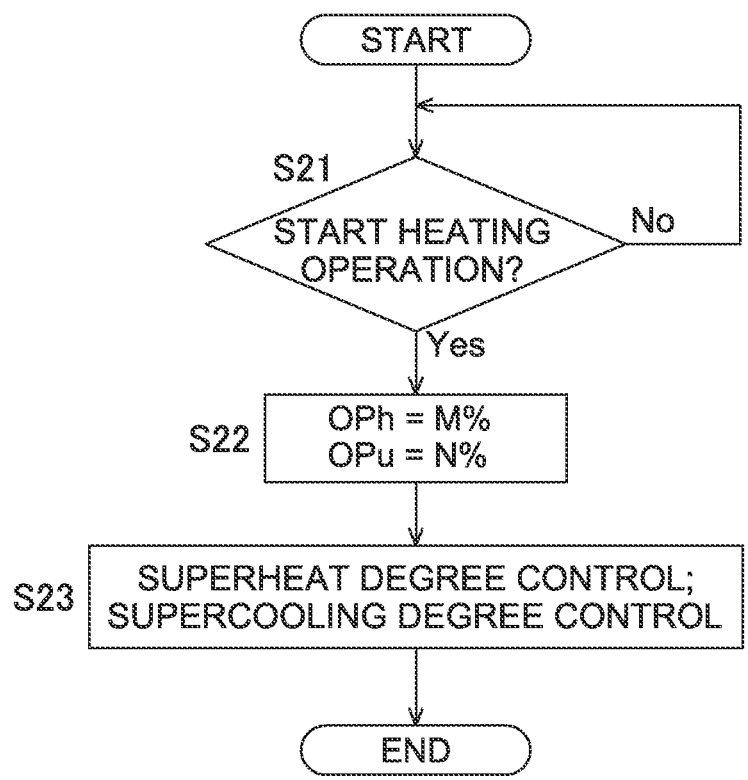
FIG. 3 is a flowchart showing the control performed at the start of heating operation.

At the start of air-warming operation as the heating operation described above, control is performed in the heat pump system 1 in order to achieve a stable state in which a refrigerant excess does not readily occur. This control performed at the start of air-warming operation will be described using FIG. 3.

When air-warming operation is started (step S21), the controller 1a sets the heat-source-side expansion valve 28 to an initial opening degree OPhi and sets the usage-side expansion valves 82a, 82b to an initial opening degree OPui (step S22). The initial opening degree OPhi herein is set to M %, and the initial opening degree OPui is set to N %. The value of M is set to 30% or less of the maximum opening degree of the heat-source-side expansion valve 28, and the value of N is set to 50% or more of the maximum opening degree of the usage-side expansion valves 82a, 82b.

The controller 1a starts the superheat degree control and subcooling degree control described above in the setting of the opening degrees of the heat-source-side expansion valve 28 and usage-side expansion valves 82a, 82b (step S23). Then, at the start of air-warming operation, since the heat-source-side expansion valve 28 is set to an opening degree 30% or less of the maximum opening degree thereof, the heat-source-side expansion valve 28 is controlled in the opening direction thereof. Moreover, since the usage-side expansion valves 82a, 82b are also set to an opening degree 50% or more of the maximum opening degree thereof at the start of air-warming operation, evacuation of refrigerant from the usage-side heat exchangers 81a, 81b functioning as heat-source-side refrigerant condensers is promoted.

<Characteristics>

The heat pump system 1 has such characteristics as those described below.

—A—

When a refrigerant excess occurs in the heat-source-side refrigerant circuit 20 during air-warming operation as the heating operation, the heat-source-side refrigerant is prone to accumulate in the usage-side heat exchangers 81a, 81b functioning as heat-source-side refrigerant condensers. Therefore, when the usage-side expansion valves 82a, 82b are controlled so that the degree of subcooling SCu of the outlet refrigerant is equal to the target degree of subcooling SCus of the outlet refrigerant, the usage-side expansion valves 82a, 82b operate in the opening direction, and the opening degree of the usage-side expansion valves 82a, 82b tends to be greater than the proper range. However, when the excess refrigerant is stored in the heat-source-side accumulator 32, the amount of accumulated heat-source-side refrigerant decreases in the usage-side heat exchangers 81a, 81b functioning as heat-source-side refrigerant condensers. Therefore, when the usage-side expansion valves 82a, 82b are controlled so that the degree of subcooling SCu of the outlet refrigerant is equal to the target degree of subcooling SCus of the outlet refrigerant, the usage-side expansion valves 82a, 82b operate in the closing direction, and the opening degree of the usage-side expansion valves 82a, 82b tends to decrease to the proper range.

In the heat pump system 1, the presence of a refrigerant excess can be determined by using the operating tendency of the usage-side expansion valves 82a, 82b when under control so that the degree of subcooling SCu of the outlet refrigerant is equal to the target degree of subcooling SCus of the outlet refrigerant. In other words, in the heat pump system 1, it is possible to determine that a refrigerant excess has occurred by detecting a state in which the usage-side expansion valves 82a, 82b are opened to be greater than the opening degree OPcs for the start of refrigerant recovery. In the heat pump system 1, it is also possible to determine that the heat-source-side refrigerant has been stored as excess refrigerant in the heat-source-side accumulator 32 by detecting a state in which the usage-side expansion valves 82a, 82b are closed to be smaller than the opening degree OPce for the end of refrigerant recovery.

In the heat pump system 1, when the usage-side expansion valves 82a, 82b are opened to be greater than the opening degree OPcs for the start of refrigerant recovery, refrigerant recovery control is performed by using the heat-source-side expansion valve 28. In other words, when the heat-source-side expansion valve 28 is controlled so that the degree of superheat SHh of the outlet refrigerant is equal to the target degree of superheat SHhs of the outlet refrigerant, and the usage-side expansion valves 82a, 82b are opened to be greater than the opening degree OPcs for the start of refrigerant recovery, the heat-source-side expansion valve 28 is operated in the opening direction by changing the target degree of superheat SHhs of the outlet refrigerant so that the heat-source-side refrigerant in the outlet of the heat-source-side heat exchanger 26 is wet. The wet heat-source-side refrigerant is thereby caused to flow into the heat-source-side accumulator 32, and the heat-source-side refrigerant can be stably recovered in the heat-source-side accumulator 32 and stored as excess refrigerant without heating and evaporating the heat-source-side refrigerant in the heat-source-side accumulator 32. In the heat pump system 1, the heat-source-side expansion valve 28 is operated in the closing direction by cancelling the change in the target degree of superheat SHhs of the outlet refrigerant when the usage-side expansion valves 82a, 82b are closed to be smaller than the opening degree OPce for the end of refrigerant recovery. Refrigerant recovery control can thereby be appropriately ended.

Since the refrigerant recovery control described above is employed in the heat pump system 1, during air-warming operation, the heat-source-side refrigerant can be more stably recovered and stored as excess refrigerant in the heat-source-side accumulator 32 than in a case in which control is employed for recovering the heat-source-side refrigerant in the heat-source-side accumulator 32 by using the intake return tube 29.

—B—

In the heat pump system 1, since the heat-source-side expansion valve 28 is operated in the opening direction by changing the target degree of superheat SHIN of the outlet refrigerant to less than 0° C. during refrigerant recovery control, the heat-source-side refrigerant in the outlet of the heat-source-side heat exchanger 26 can reliably be made wet.

—C—

In the heat pump system 1, since the target degree of superheat SHhs of the outlet refrigerant is set to 0° C. to 1° C. and the heat-source-side expansion valve 28 is controlled when refrigerant recovery control is not performed, a state occurs in which the heat-source-side refrigerant in the outlet of the heat-source-side heat exchanger 26 is in a nearly saturated gas state, and there is minimal change in the opening degree of the heat-source-side expansion valve 28. The operating state is thereby stabilized during the time that refrigerant recovery control is not performed, and it is possible to more precisely determine the presence of a refrigerant excess by using the operating tendency of the heat-source-side expansion valve 28.

—D—

In the heat pump system 1, since the opening degree OPce for the end of refrigerant recovery is less than the opening degree OPcs for the start of refrigerant recovery, refrigerant can be adequately recovered in the heat-source-side accumulator 32.

—E—

During the refrigerant recovery control described above, there is a risk of overflow of the heat-source-side refrigerant stored in the heat-source-side accumulator 32, due to such causes as overfilling of refrigerant into the heat-source-side refrigerant circuit 20. The degree of superheat SHc of the discharge refrigerant tends to decrease when the heat-source-side refrigerant overflows from the heat-source-side accumulator 32.

In the heat pump system 1, the presence of an overflow of heat-source-side refrigerant from the heat-source-side accumulator 32 can be determined by using the tendency of the degree of superheat SHc of the discharge refrigerant. In other words, in the heat pump system 1, it is possible to determine that an overflow of the heat-source-side refrigerant from the heat-source-side accumulator 32 has occurred by detecting that the degree of superheat SHc of the discharge refrigerant is less than the lower limit discharge degree of superheat SHm.

In the heat pump system 1, when the degree of superheat SHc of the discharge refrigerant is less than the lower limit discharge degree of superheat SHm, overflow prevention control is performed by using the heat-source-side expansion valve 28, which is controlled so that the degree of superheat SHh of the outlet refrigerant is equal to the target degree of superheat SHhs of the outlet refrigerant. In other words, when the degree of superheat SHh of the outlet refrigerant is less than the lower limit discharge degree of superheat SHm, by changing the target degree of superheat SHhs of the outlet refrigerant so that the degree of superheat SHh of the outlet refrigerant increases, the heat-source-side expansion valve 28 is operated in the closing direction. The degree of superheat of the heat-source-side refrigerant flowing into the heat-source-side accumulator 32 is thereby increased, and refrigerant recovery control can be stopped.

Since the overflow prevention control described above is employed in the heat pump system 1, it is possible to prevent the heat-source-side refrigerant from overflowing from the heat-source-side accumulator 32 during refrigerant recovery control.

—F—

When a refrigerant deficiency occurs in the heat-source-side refrigerant circuit 20 during air-warming operation as the heating operation, the heat-source-side refrigerant does not readily accumulate in the usage-side heat exchangers 81a, 81b, which function as heat-source-side refrigerant condensers. Therefore, when the usage-side expansion valves 82a, 82b are controlled so that the degree of subcooling SCu of the outlet refrigerant is equal to the target degree of subcooling SCus of the outlet refrigerant, the usage-side expansion valves 82a, 82b operate in the closing direction, and the opening degree of the usage-side expansion valves 82a, 82b tends to be less than the proper range. However, when the heat-source-side refrigerant is evacuated from the heat-source-side accumulator 32, the heat-source-side refrigerant more readily accumulates in the usage-side heat exchangers 81a, 81b functioning as heat-source-side refrigerant condensers. Therefore, when the usage-side expansion valves 82a, 82b are controlled so that the degree of subcooling SCu of the outlet refrigerant is equal to the target degree of subcooling SCus of the outlet refrigerant, the usage-side expansion valves 82a, 82b operate in the opening direction, and the opening degree of the usage-side expansion valves 82a, 82b tends to increase to the proper range.

In the heat pump system 1, the presence of a refrigerant excess can be determined by using the operating tendency of the usage-side expansion valves 82a, 82b when under control so that the degree of subcooling SCu of the outlet refrigerant is equal to the target degree of subcooling SCus of the outlet refrigerant. In other words, in the heat pump system 1, it is possible to determine that a refrigerant deficiency has occurred by detecting a state in which the usage-side expansion valves 82a, 82b are closed to be smaller than the opening degree OPes for the start of refrigerant evacuation. In the heat pump system 1, it is also possible to determine that a refrigerant deficiency has been overcome by detecting a state in which the usage-side expansion valves 82a, 82b are opened to be greater than the opening degree OPee for the end of refrigerant evacuation.

In the heat pump system 1, when the usage-side expansion valves 82a, 82b are closed to be smaller than the opening degree OPes for the start of refrigerant evacuation, refrigerant evacuation control is performed by using the heat-source-side expansion valve 28, which is controlled so that the degree of superheat SHh of the outlet refrigerant is equal to the target degree of superheat SHhs of the outlet refrigerant. In other words, when the usage-side expansion valves 82a, 82b are closed to be smaller than the opening degree OPes for the start of refrigerant evacuation, the heat-source-side expansion valve 28 is operated in the closing direction by changing the target degree of superheat SHhs of the outlet refrigerant so that the degree of superheat SHh of the outlet refrigerant increases. The degree of superheat of the heat-source-side refrigerant flowing into the heat-source-side accumulator 32 is thereby increased, the heat-source-side refrigerant in the heat-source-side accumulator 32 is heated and evaporated, the heat-source-side refrigerant stored in the heat-source-side accumulator 32 is stably evacuated, and a refrigerant deficiency can be overcome. In the heat pump system 1, the heat-source-side expansion valve 28 is operated in the opening direction by cancelling the change in the target degree of superheat SHhs of the outlet refrigerant when the usage-side expansion valves 82a, 82b are opened to be greater than the opening degree OPee for the end of refrigerant evacuation. Refrigerant evacuation control can thereby be appropriately ended.

Since the refrigerant evacuation control described above is employed in the heat pump system 1, when a refrigerant deficiency occurs during air-warming operation, the heat-source-side refrigerant can be evacuated from the heat-source-side accumulator 32 to overcome the refrigerant deficiency.

—G—

In the heat pump system 1, since the target degree of superheat SHhs of the outlet refrigerant is set to 0° C. to 1° C. and the heat-source-side expansion valve 28 is controlled when refrigerant evacuation control is not performed, a state occurs in which the heat-source-side refrigerant in the outlet of the heat-source-side heat exchanger 26 is in a nearly saturated gas state, and there is minimal change in the opening degree of the heat-source-side expansion valve 28. The operating state is thereby stabilized during the time that refrigerant evacuation control is not performed, and it is possible to more precisely determine the presence of a refrigerant deficiency by using the operating tendency of the usage-side expansion valves 82a, 82b.

—H—

In the heat pump system 1, by changing the target degree of superheat SHhs of the outlet refrigerant to 2° C. or higher during the refrigerant evacuation control, the heat-source-side expansion valve 28 is operated in the closing direction, and the degree of superheat of the refrigerant in the outlet of the heat-source-side heat exchanger 26 can therefore be reliably increased.

—I—

In the heat pump system 1, since the opening degree OPes for the start of refrigerant evacuation is less than the opening degree OPee for the end of refrigerant evacuation, the heat-source-side refrigerant can be adequately evacuated from the heat-source-side accumulator 32.

—J—

In the heat pump system 1, by setting the heat-source-side expansion valve 28 to an opening degree 30% or less of the maximum opening degree thereof at the start of air-warming operation as the heating operation, the heat-source-side expansion valve 28 is controlled in the opening direction. In the heat pump system 1, setting the usage-side expansion valves 82a, 82b to an opening degree 50% or more of the maximum opening degree thereof at the start of air-warming operation promotes evacuation of the heat-source-side refrigerant from the usage-side heat exchangers 81a, 81b functioning as heat-source-side refrigerant condensers. The heat-source-side refrigerant thereby does not readily accumulate in the usage-side heat exchangers 81a, 81b, the flow of the heat-source-side refrigerant into the heat-source-side heat exchanger 26 is promoted, and a stable state can be obtained in which a refrigerant excess does not readily occur in the heat pump system 1 at the start of air-warming operation.

(2) Second Embodiment

<Configuration>

—General—

Figure 4:
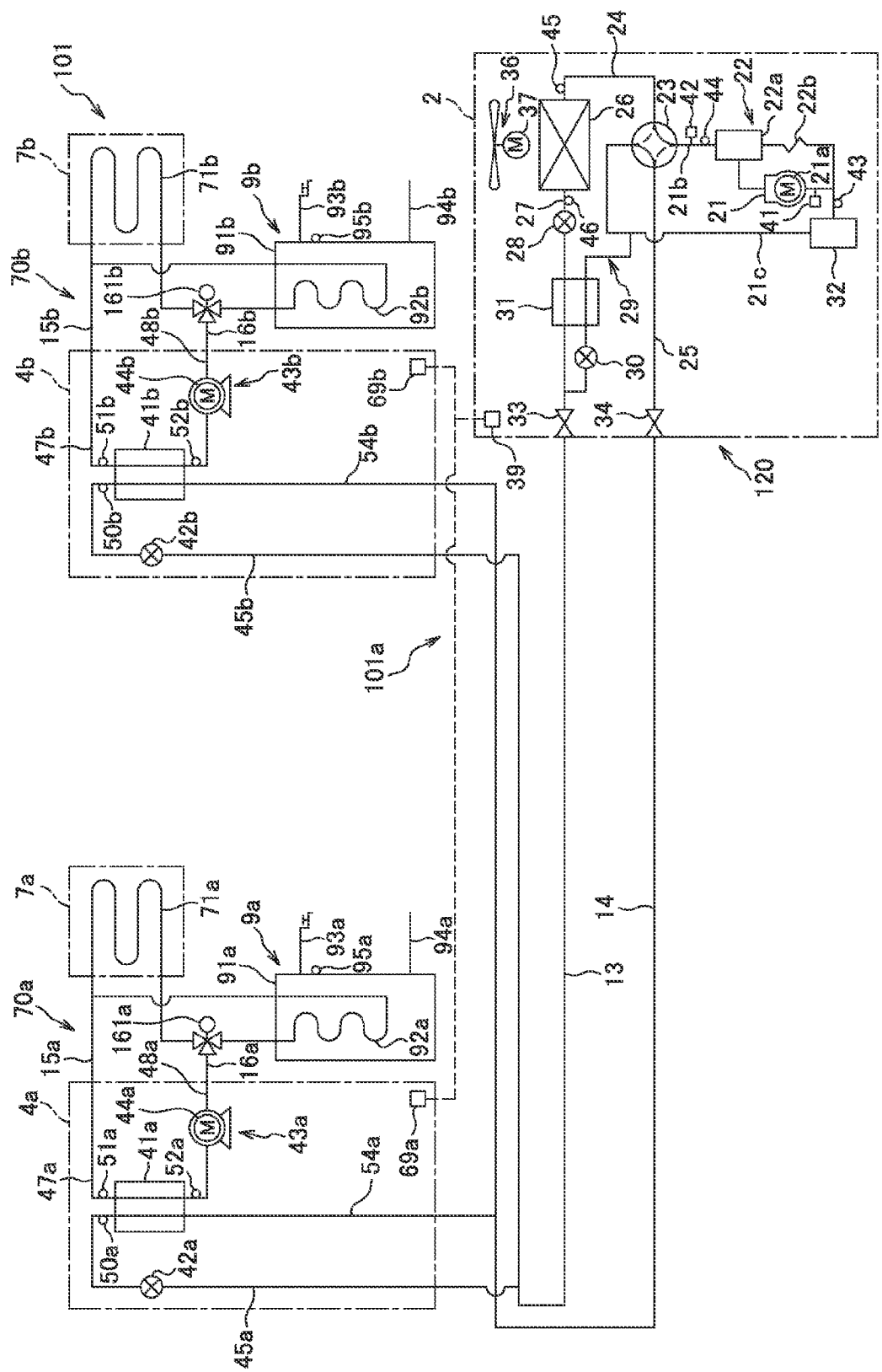
FIG. 4 is a schematic structural view showing the heat pump system according to a second embodiment of the present invention.

FIG. 4 is a schematic structural view showing the heat pump system 101 according to a second embodiment of the present invention. The heat pump system 101 is an apparatus capable of operation for cooling an aqueous medium, operation for heating an aqueous medium, and other operation by utilizing a vapor compression heat pump cycle. The heat pump system 101 herein is capable of air-cooling operation as a cooling operation by cooling of an aqueous medium, air-warming operation and/or hot-water supply operation as a heating operation by heating of an aqueous medium, and other operation.

The heat pump system 101 has primarily the heat source unit 2, usage units 4a, 4b, the liquid refrigerant communication tube 13, the gas refrigerant communication tube 14, aqueous medium cooling/warming units 7a, 7b, hot-water storage units 9a, 9b, and aqueous medium communication tubes 15a, 16a, 15b, 16b. The heat source unit 2 and the usage units 4a, 4b are connected via the refrigerant communication tubes 13, 14, thereby constituting a heat-source-side refrigerant circuit 120. The usage units 4a, 4b, the hot-water storage units 9a, 9b, and the aqueous medium cooling/warming units 7a, 7b are connected via the aqueous medium communication tubes 15a, 16a, 15b, 16b, thereby constituting aqueous medium circuits 70a, 70b. The HFC-type refrigerant HFC-410A is enclosed as heat-source-side refrigerant in the heat-source-side refrigerant circuit 120. Water as an aqueous medium is also circulated in the aqueous medium circuits 70a, 70b.

—Heat Source Unit—

The heat source unit 2 is installed outdoors, is connected to the usage units 4a, 4b via the refrigerant communication tubes 13, 14, and constitutes a portion of the heat-source-side refrigerant circuit 120. The heat source unit 2 has the same configuration as the heat source unit 2 of the first embodiment. Therefore, no detailed description of the heat source unit 2 of the present embodiment will be given.

—Liquid Refrigerant Communication Tube—

The liquid refrigerant communication tube 13 has the same configuration as the liquid refrigerant communication tube 13 of the first embodiment. Therefore, no detailed description of the liquid refrigerant communication tube 13 of the present embodiment will be given.

—Gas Refrigerant Communication Tube—

The gas refrigerant communication tube 14 has the same configuration as the gas refrigerant communication tube 14 of the first embodiment. Therefore, no detailed description of the gas refrigerant communication tube 14 of the present embodiment will be given.

—Usage Units—

The usage units 4a, 4b are installed indoors, are connected to the heat source unit 2 via the refrigerant communication tubes 13, 14, and constitute a portion of the heat-source-side refrigerant circuit 120. The usage units 4a, 4b are also connected to the hot-water storage units 9a, 9b and the aqueous medium cooling/warming units 7a, 7b via the aqueous medium communication tubes 15a, 16a, 15b, 16b, and constitute a portion of the aqueous medium circuits 70a, 70h. The usage unit 4b has the same configuration as the usage unit 4a. Therefore, only the configuration of the usage unit 4a will be described. To refer to the configuration of the usage unit 4b, the subscript "b" is added instead of "a" to the reference signs for indicating the components of the usage unit 4a, and the components of the usage unit 4b will not be described.

The usage unit 4a has primarily a usage-side heat exchanger 41a, a usage-side expansion valve 42a, and a circulation pump 43a.

The usage-side heat exchanger 41a is a heat exchanger for functioning as a heat-source-side refrigerant radiator or evaporator by exchanging heat between the heat-source-side refrigerant and the aqueous medium. A usage-side liquid refrigerant gibe 45a is connected to the liquid side of a flow passage through which the heat-source-side refrigerant flows in the usage-side heat exchanger 41a, and a usage-side gas refrigerant tube 54a is connected to the gas side of the flow passage through which the heat-source-side refrigerant flows in the usage-side heat exchanger 41a. A usage-side water inlet tube 47a is connected to the inlet side of a flow passage through which the aqueous medium flows in the usage-side heat exchanger 41a, and a usage-side water outlet tube 48a is connected to the outlet side of the flow passage through which the aqueous medium flows in the usage-side heat exchanger 41a. The liquid refrigerant communication tube 13 is connected to the usage-side liquid refrigerant tube 45a, and the gas refrigerant communication tube 14 is connected to the usage-side gas refrigerant tube 54a. The aqueous medium communication tube 15a is connected to the usage-side water inlet tube 47a, and the aqueous medium communication tube 16a is connected to the usage-side water outlet tube 48a.

The usage-side expansion valve 42a is an electrically driven expansion valve whereby the rate of heat-source-side refrigerant flowing through the usage-side heat exchanger 41a can be varied by controlling the opening degree of the usage-side expansion valve 42a, and the usage-side expansion valve 42a is provided to the usage-side liquid refrigerant tube 45a.

The circulation pump 43a is a mechanism for pressurizing the aqueous medium, and the circulation pump 43a used herein is a pump in which a centrifugal or positive-displacement pump element (not shown) is driven by a circulation pump motor 44a. The circulation pump 43a is provided to the usage-side water outlet tube 48a. The rotation speed (i.e., the operating frequency) of the circulation pump motor 44a can be varied by an inverter apparatus (not shown), and the capacity of the circulation pump 43a can thereby be controlled.

Various sensors are provided to the usage unit 4a. Specifically, the usage unit 4a is provided with a usage-side heat exchange temperature sensor 50a for detecting a usage-side heat exchange liquid-side temperature Tu1, which is the temperature of the heat-source-side refrigerant on the liquid side of the usage-side heat exchanger 41a; an aqueous medium inlet temperature sensor 51a for detecting an aqueous medium inlet temperature Twr, which is the temperature of the aqueous medium in the inlet of the usage-side heat exchanger 41a; and an aqueous medium outlet temperature sensor 52a for detecting an aqueous medium outlet temperature Tw1, which is the temperature of the aqueous medium in the outlet of the usage-side heat exchanger 41a. The usage unit 4a also has a usage-side controller 69a for controlling the operation of each component of the usage unit 4a. The usage-side controller 69a has a microcomputer and/or memory and other components for controlling the usage unit 4a. The usage-side controller 69a is configured so as to be capable of exchanging control signals and the like with a remote control (not shown), and exchanging control signals and the like with the heat-source-side controller 39 of the heat source unit 2.

—Hot-Water Storage Units—

The hot-water storage units 9a, 9b are installed indoors, are connected to the usage units 4a, 4b via the aqueous medium communication tubes 15a, 16a, 15b, 16b, and constitute a portion of the aqueous medium circuits 70a, 70b. The hot-water storage unit 9h has the same configuration as the hot-water storage unit 9a. Therefore, only the configuration of the hot-water storage unit 9a will be described. To refer to the configuration of the hot-water storage unit 9h, the subscript "b" is added instead of "a" to the reference signs for indicating the components of the hot-water storage unit 9a, and the components of the hot-water storage unit 9b will not be described.

The hot-water storage unit 9a has primarily a hot-water storage tank 91a and a heat exchange coil 92a.

The hot-water storage tank 91a is a container for storing water as the aqueous medium tier the hot water supply, a hot-water supply tube 93a for sending the aqueous medium as warm water to a faucet, shower, or the like is connected to the top of the hot-water storage tank 91a, and a water supply tube 94a for replenishing the aqueous medium expended by the hot-water supply tube 93a is connected to the bottom of the hot-water storage tank 91a.

The heat exchange coil 92a is provided inside the hot-water storage tank 91a, and is a heat exchanger for functioning as a heater of the aqueous medium in the hot-water storage tank 91a by exchanging heat between the aqueous medium circulating through the aqueous medium circuit 70a and the aqueous medium inside the hot-water storage tank 91a. The aqueous medium communication tube 16a is connected to the inlet of the heat exchange coil 92a, and the aqueous medium communication tube 15a is connected to the outlet thereof.

The hot-water storage unit 9a is thereby capable of heating the aqueous medium inside the hot-water storage tank 91a through the use of the aqueous medium circulating through the aqueous medium circuit 70a, the aqueous medium having been heated in the usage unit 4a, and storing the aqueous medium as warm water. The type of hot-water storage unit 9a used herein is a hot-water storage unit for storing in a hot-water storage tank the aqueous medium heated by heat exchange with the aqueous medium heated in the usage unit 4a, but a type of hot-water storage unit for storing an aqueous medium heated in the usage unit 4a in a hot-water storage tank may also be used. The hot-water storage unit 9a herein is configured as a separate unit from the usage unit 4a, but the hot-water storage unit 9a may also be housed within the usage unit 4a.

Various sensors are also provided to the hot-water storage unit 9a. Specifically, the hot-water storage unit 9a is provided with a hot-water storage temperature sensor 95a for detecting a hot-water storage temperature Twh, which is the temperature of the aqueous medium stored in the hot-water storage tank 91a.

—Aqueous Medium Cooling/Heating Units—

The aqueous medium cooling/warming units 7a, 7b are installed indoors. The aqueous medium cooling/warming units 7a, 7b are connected to the usage units 4a, 4b via the aqueous medium communication tubes 15a, 16a, 15b, 16b, and constitute a portion of the aqueous medium circuits 70a, 70b. The aqueous medium cooling/warming unit 7b has the same configuration as the aqueous medium cooling/warming unit 7a. Therefore, only the configuration of the aqueous medium cooling/warming unit 7a will be described. To refer to the configuration of the aqueous medium cooling/warming unit 7b, the subscript "b" is added instead of "a" to the reference signs for indicating the components of the aqueous medium cooling/warming unit 7a, and the components of the aqueous medium cooling/warming unit 7b will not be described.

The aqueous medium cooling/warming unit 7a has primarily a heat exchange panel 71a, and is composed of a radiator and/or a floor cooling/heating panel and other components.

The heat exchange panel 71a is provided alongside a wall or elsewhere indoors when configured as a radiator, and is provided under the floor or elsewhere indoors when configured as a floor cooling/heating panel. The heat exchange panel 71a is a heat exchanger for functioning as a radiator or heater of the aqueous medium circulated through the aqueous medium circuit 70a, and the aqueous medium communication tube 16a is connected to the inlet of the heat exchange panel 71a, and the aqueous medium communication tube 15a is connected to the outlet of the heat exchange panel 71a.

—Aqueous Medium Communication Tubes—

The aqueous medium communication tubes 15a, 15b are connected to the outlet of the heat exchange coil 92a of the hot-water storage unit 9a, and the outlets of the heat exchange panels 71a, 71b of the aqueous medium cooling/warming units 7a, 7b. The aqueous medium communication tubes 16a, 16b are connected to the inlet of the heat exchange coil 92a of the hot-water storage unit 9a, and the inlets of the heat exchange panels 71a, 71b of the aqueous medium cooling/warming units 7a, 7b. The aqueous medium communication tubes 16a, 16b are provided with an aqueous medium switching mechanism 161a capable of switching between feeding the aqueous medium circulated through the aqueous medium circuits 70a, 70b to both the hot-water storage units 9a, 9b and the aqueous medium cooling/warming units 7a, 7b, or to any one of the hot-water storage unit 9a and the aqueous medium cooling/warming units 7a, 7b. The aqueous medium switching mechanism 161a is composed of a three-way valve.

A controller 101a tier controlling the operation of the heat pump system 101 is composed of the usage-side controllers 69a, 69b and the heat-source-side controller 39, and the controller 101a is configured to perform the operations and/or various types of control described below.

<Operation>

The operation of the heat pump system 101 will next be described.

Operation of the heat pump system 101 includes an air-warming operation mode for performing only the air-warming operation (heating operation) using the aqueous medium cooling/warning unit 7a and/or aqueous medium cooling/warming unit 7b; a hot-water supply operation mode for performing only the hot-water supply operation (heating operation) using the hot-water storage unit 9a and/or hot-water storage unit 9b; a hot-water supply/air-warming operation mode for simultaneously performing the air-warming operation and the hot-water supply operation (heating operation) using the aqueous medium cooling/warming unit 7a and hot-water storage unit 9a, and/or the aqueous medium cooling/warning unit 7b and hot-water storage unit 9b; and an air-cooling operation mode for performing only the air-cooling operation (cooling operation) using the aqueous medium cooling/warming unit 7a and/or aqueous medium cooling/warming unit 7b. In the air-warming operation mode, the hot-water supply operation mode, and the hot-water supply/air-warming operation mode, the usage units 4a, 4b operate (heating operation) such that the usage-side heat exchangers 41a, 41b function as refrigerant radiators, and in the air-cooling operation mode, the usage units 4a, 4b operate (cooling operation) such that the usage-side heat exchangers 41a, 41b function as refrigerant evaporators.

—Air-warming Operation Mode—

In the case of performing only the air-warming operation using the aqueous medium cooling/warming unit 7a and/or aqueous medium cooling/warming unit 7b, the switching mechanism 23 is switched to the heat-source-side evaporating operation state (indicated by dashed lines in the switching mechanism 23 in FIG. 4) in the heat-source-side refrigerant circuit 120, and the intake return expansion valve 30 is closed. In the aqueous medium circuits 70a, 70b, the aqueous medium switching mechanisms 161a, 161b are switched to a state in which the aqueous medium is fed to the aqueous medium cooling/warming units 7a, 7b.

In the heat-source-side refrigerant circuit 120 in such a state, the heat-source-side refrigerant at a low pressure in the refrigeration cycle is drawn into the compressor 21 through the intake tube 21c and compressed to a high pressure in the refrigeration cycle, and subsequently discharged to the discharge tube 21b. In the oil separator 22a, the refrigeration machine oil is separated from the high-pressure heat-source-side refrigerant discharged to the discharge tube 21b. The refrigeration machine oil separated from the heat-source-side refrigerant in the oil separator 22a is returned to the intake tube 21c through the oil return tube 22b. The high-pressure heat-source-side refrigerant from which the refrigeration machine oil has been separated is sent from the heat source unit 2 to the gas refrigerant communication tube 14 through the switching mechanism 23, the second heat-source-side gas refrigerant tube 25, and the gas-side shutoff valve 34.

The high-pressure heat-source-side refrigerant sent to the gas refrigerant communication tube 14 is sent to the usage units 4a, 4b. The high-pressure heat-source-side refrigerant sent to the usage units 4a, 4b is sent to the usage-side heat exchangers 41a, 41b through the usage-side gas refrigerant tubes 54a, 54b. The high-pressure heat-source-side refrigerant sent to the usage-side heat exchangers 41a, 41b is heat-exchanged and radiated in the usage-side heat exchangers 41a, 41b with the aqueous medium circulated through the aqueous medium circuits 70a, 70b by the circulation pumps 43a, 43b. The high-pressure heat-source-side refrigerant radiated in the usage-side heat exchangers 41a, 41b is sent from the usage units 4a, 4b to the liquid refrigerant communication tube 13 through the usage-side expansion valves 42a, 42b and the usage-side liquid refrigerant tubes 45a, 45b.

The heat-source-side refrigerant sent to the liquid refrigerant communication tube 13 is sent to the heat source unit 2. The heat-source-side refrigerant sent to the heat source unit 2 is sent to the subcooler 31 through the liquid-side shutoff valve 33. Since the heat-source-side refrigerant does not flow to the intake return tube 29, the heat-source-side refrigerant sent to the subcooler 31 is sent to the heat-source-side expansion valve 28 without being heat-exchanged. The heat-source-side refrigerant sent to the heat-source-side expansion valve 28 is depressurized in the heat-source-side expansion valve 28 to a low-pressure gas-liquid two-phase state, and sent to the heat-source-side heat exchanger 26 through the heat-source-side liquid refrigerant tube 27. The tow-pressure heat-source-side refrigerant sent to the heat-source-side heat exchanger 26 is heat-exchanged and evaporated in the heat-source-side heat exchanger 26 with the outdoor air fed by the heat-source-side fan 36. The low-pressure heat-source-side refrigerant evaporated in the heat-source-side heat exchanger 26 is sent to the heat-source-side accumulator 32 through the first heat-source-side gas refrigerant tube 24 and the switching mechanism 23. The tow-pressure heat-source-side refrigerant sent to the heat-source-side accumulator 32 is again drawn into the compressor 21 the intake tube 21c.

In the aqueous medium circuits 70a, 70b, the aqueous medium circulated through the aqueous medium circuits 70a, 70b is heated by the radiating of the heat-source-side refrigerant in the usage-side heat exchangers 41a, 41b. The aqueous medium heated in the usage-side heat exchangers 41a, 41b is drawn into the circulation pumps 43a, 43b through the usage-side water outlet tubes 48a, 48b and pressurized, and subsequently sent from the usage units 4a, 4b to the aqueous medium communication tubes 16a, 16b. The aqueous medium sent to the aqueous medium communication tubes 16a, 16b is sent to the aqueous medium cooling/warming units 7a, 7b through the aqueous medium switching mechanisms 161a, 161b. The aqueous medium sent to the aqueous medium cooling/warming units 7a, 7b is radiated in the heat exchange panels 71a, 71b, the walls and other indoor areas are thereby heated, and the indoor floor is heated.

The operations in the air-warming operation mode for performing only the air-warming operation using the aqueous medium cooling/warming unit 7a and/or aqueous medium cooling/warming unit 7b are thus performed.

—Hot-water Supply Operation Mode—

In the case of performing only the hot-water supply operation using the hot-water storage unit 9a and/or hot-water storage unit 9b, the switching mechanism 23 is switched to the heat-source-side evaporating operation state (indicated by dashed lines in the switching mechanism 23 in FIG. 4) in the heat-source-side refrigerant circuit 120, and the intake return expansion valve 30 is closed. In the aqueous medium circuits 70a, 70h, the aqueous medium switching mechanisms 161a, 161b are switched to a state in which the aqueous medium is fed to the hot-water storage units 9a, 9b.

In the heat-source-side refrigerant circuit 120 in such a state, the same operations as those of the air-warming operation described above are performed.

In the aqueous medium circuits 70a, 70b, the aqueous medium sent from the usage units 4a, 4b to the aqueous medium communication tubes 16a, 16b is sent to the hot-water storage units 9a, 9b through the aqueous medium switching mechanisms 161a, 161b. The aqueous medium sent to the hot-water storage units 9a, 9b is heat-exchanged and radiated in the heat exchange coils 92a, 92b with the aqueous medium in the hot-water storage tanks 91a, 91b, and the aqueous medium in the hot-water storage tanks 91a, 91b is thereby heated.

The operations in the hot-water supply operation mode for performing only the hot-water supply operation using the hot-water storage unit 9a and/or hot-water storage unit 9b are thus performed.

—Hot-water Supply/Air-warming Operation Mode—

In the case of simultaneously performing the air-warming operation and the hot-water supply operation using the aqueous medium cooling/warming unit 7a and hot-water storage unit 9a, and/or the aqueous medium cooling/warming unit 7b and hot-water storage unit 9b, the switching mechanism 23 is switched to the heat-source-side evaporating operation state (indicated by dashed lines in the switching mechanism 23 in FIG. 4) in the heat-source-side refrigerant circuit 120, and the intake return expansion valve 30 is closed. In the aqueous medium circuits 70a, 70b, the aqueous medium switching mechanisms 161a, 161b are switched to a state in which the aqueous medium is fed to the aqueous medium cooling/warming units 7a, 7b and the hot-water storage units 9a, 9b.

In the heat-source-side refrigerant circuit 120 in such a state, the same operations as those of the air-warming operation described above are performed.

In the aqueous medium circuits 70a, 70b, the aqueous medium sent from the usage units 4a, 4b to the aqueous medium communication tubes 16a, 16b is sent to the aqueous medium cooling/warming units 7a, 7b and the hot-water storage units 9a, 9b through the aqueous medium switching mechanisms 161a, 161'b. The aqueous medium sent to the aqueous medium cooling/warming units 7a, 7b is radiated in the heat exchange panels 71a, 71b, the walls and other indoor areas are thereby heated, and the indoor floor is heated. The aqueous medium sent to the hot-water storage units 9a, 9b is also heat-exchanged and radiated in the heat exchange coils 92a, 92b with the aqueous medium in the hot-water storage tanks 91a, 91b, and the aqueous medium in the hot-water storage tanks 91a, 91b is thereby heated.

The operations in the hot-water supply/air-warming operation mode for simultaneously performing the air-warming operation and hot-water supply operation using the aqueous medium cooling/warming unit 7a and hot-water storage unit 9a, and/or the hot-aqueous medium cooling/warming unit 7b and hot-water storage unit 9b are thus performed.

—Air-cooling Operation Mode—

In a case of performing only the air-cooling operation using the aqueous medium cooling/warming unit 7a and/or aqueous medium cooling/warming unit 7b, the switching mechanism 23 is switched to the heat-source-side radiating operation state (indicated by solid lines in the switching mechanism 23 in FIG. 1) in the heat-source-side refrigerant circuit 120. In the aqueous medium circuits 70a, 70b, the aqueous medium switching mechanisms 161a, 161b are switched to a state in which the aqueous medium is fed to the aqueous medium cooling/warming units 7a, 7b.

In the heat-source-side refrigerant circuit 120 in such a state, the heat-source-side refrigerant at the low pressure in the refrigeration cycle is drawn into the compressor 21 through the intake tube 21c and compressed to the high pressure in the refrigeration cycle, and subsequently discharged to the discharge tube 21b. In the oil separator 22a, the refrigeration machine oil is separated from the high-pressure heat-source-side refrigerant discharged to the discharge tube 21b. The refrigeration machine oil separated from the heat-source-side refrigerant in the oil separator 22a is returned to the intake tube 21c through the oil return tube 22b. The high-pressure heat-source-side refrigerant from which the refrigeration machine oil has been separated is sent to the heat-source-side heat exchanger 26 through the switching mechanism 23 and the first heat-source-side gas refrigerant tube 24. The high-pressure heat-source-side refrigerant sent to the heat-source-side heat exchanger 26 is heat-exchanged and radiated in the heat-source-side heat exchanger 26 with the outdoor air fed by the heat-source-side fan 36. The high-pressure heat-source-side refrigerant radiated in the heat-source-side heat exchanger 26 is sent to the subcooler 31 through the heat-source-side expansion valve 28. The heat-source-side refrigerant sent to the subcooler 31 is heat-exchanged with the heat-source-side refrigerant diverted to the intake return tube 29 from the heat-source-side liquid refrigerant tube 27, and is cooled to a subcooled state. The heat-source-side refrigerant flowing through the intake return tube 29 is returned to the intake tube 21c. The heat-source-side refrigerant cooled in the subcooler 31 is sent from the heat source unit 2 to the liquid refrigerant communication tube 13 through the heat-source-side liquid refrigerant tube 27 and the liquid-side shutoff valve 33.

The high-pressure heat-source-side refrigerant sent to the liquid refrigerant communication tube 13 is sent to the usage units 4a, 4b. The high-pressure heat-source-side refrigerant sent to the usage units 4a, 4b is sent to the usage-side expansion valves 42a, 42b. The high-pressure heat-source-side refrigerant sent to the usage-side expansion valves 42a, 42b is depressurized in the usage-side expansion valves 42a, 42b to a tow-pressure gas-liquid two-phase state, and sent to the usage-side heat exchangers 41a, 41b through the usage-side liquid refrigerant tubes 43a, 43b. The low-pressure heat-source-side refrigerant sent to the usage-side heat exchangers 41a, 41b is heat-exchanged and evaporated in the usage-side heat exchangers 41a, 41b with the aqueous medium circulated through the aqueous medium circuits 70a, 70b by the circulation pumps 43a, 43b. The low-pressure heat-source-side refrigerant evaporated in the usage-side heat exchangers 41a, 41b is sent from the usage units 4a, 4b to the gas refrigerant communication tube 14 through the usage-side gas refrigerant tubes 54a, 54b.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 32 through the gas-side shutoff valve 34, the second heat-source-side gas refrigerant tube 25, and the switching mechanism 23. The low-pressure heat-source-side refrigerant sent to the heat-source-side accumulator 32 is again drawn into the compressor 21 through the intake tube 21c.

In the aqueous medium circuits 70a, 70b, the aqueous medium circulated through the aqueous medium circuits 70a, 70b is cooled by the evaporation of the heat-source-side refrigerant in the usage-side heat exchangers 41a, 41b. The aqueous medium cooled in the usage-side heat exchangers 41a, 41b is drawn into the circulation pumps 43a, 43b through the usage-side water outlet tubes 48a, 48b and pressurized, and subsequently sent from the usage units 4a, 4b to the aqueous medium communication tubes 16a, 16b. The aqueous medium sent to the aqueous medium communication tubes 16a, 16b is sent to the aqueous medium cooling/warming units 7a, 7b through the aqueous medium switching mechanisms 161a, 161b. The heat of the aqueous medium sent to the aqueous medium cooling/warming units 7a, 7b is absorbed in the heat exchange panels 71a, 71b, the walls and other indoor areas are thereby cooled, and the indoor floor is cooled.

The operations in the air-cooling operation mode for performing only the air-cooling operation using the aqueous medium cooling/warming unit 7a and/or aqueous medium cooling/warming unit 7b are thus performed.

—Various Types of Control—

The heat pump system 101 is also configured so as to perform subcooling degree control through the use of the usage-side expansion valves 42a, 42b, superheat degree control through the use of the heat-source-side expansion valve 28, control in response to refrigerant excess and/or refrigerant deficiency (i.e., refrigerant recovery control, overflow prevention control, and refrigerant evacuation control), and control at the start of the heating operation in air-warming operation as the heating operation, hot-water supply operation, and hot-water supply/air-warming operation, the same as in the heat pump system 1 of the first embodiment. These types of control are the same as the control performed in the heat pump system 1 of the first embodiment, and no detailed description thereof will be given in the present embodiment.

<Characteristics>

—A—

The heat pump system 101 differs from the heat pump system 1 of the first embodiment in that air warming and cooling are performed via an aqueous medium. The heat pump system 101 is also capable not only of air warming and cooling, but also of hot-water supply operation.

—B—

Since the heat pump system 101 also has the heat-source-side accumulator 32, problems emerge in handling refrigerant excess and refrigerant deficiency during the heating operation (air-warming operation, hot-water supply operation, and hot-water supply/air-warming operation herein), as in the heat pump system 1 of the first embodiment. However, the same types of control as are performed in the heat pump system 1 of the first embodiment are performed in the heat pump system 101. The same operational effects as those of the heat pump system 1 of the first embodiment can therefore be obtained in the heat pump system 101 with respect to problems that arise in handling refrigerant excess and/or refrigerant deficiency.

(3) Third Embodiment

<Configuration of Heat Pump System>

—General—

Figure 5:
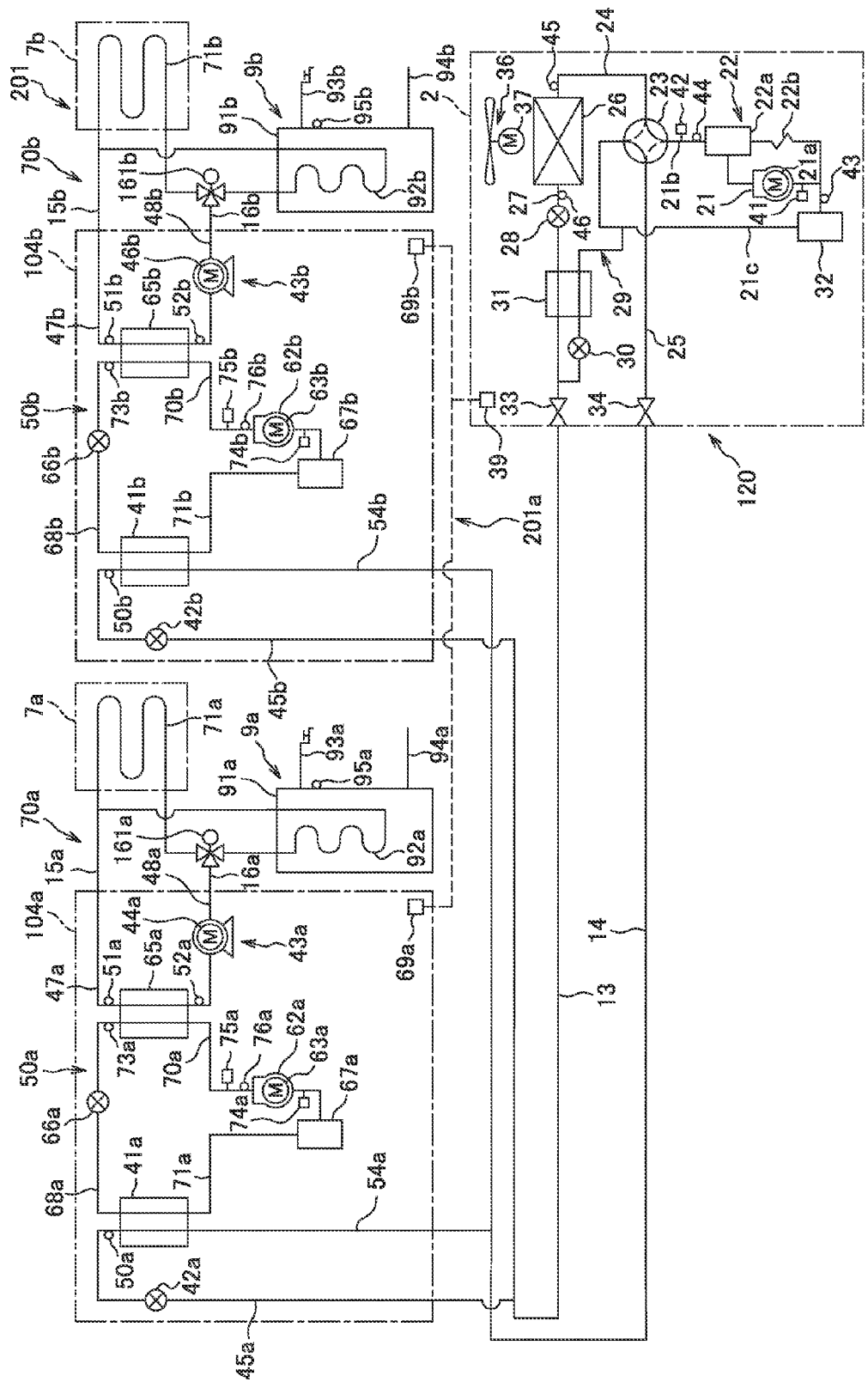
FIG. 5 is a schematic structural view showing the heat pump system according to a third embodiment of the present invention.

FIG. 5 is a schematic structural view showing the heat pump system 201 according to a third embodiment of the present invention. The heat pump system 201 is an apparatus capable of such operations as heating an aqueous medium by utilizing a vapor compression heat pump cycle. The heat pump system 201 herein is capable of such operations as air-warming operation and/or hot-water supply operation as heating operations by heating of an aqueous medium.

The heat pump system 201 has primarily the heat source unit 2, usage units 104a, 104b, the liquid refrigerant communication tube 13, the gas refrigerant communication tube 14, aqueous medium warming units 7a, 7b, hot-water storage units 9a, 9b, and aqueous medium communication tubes 15a, 16a, 15b, 16b. The heat source unit 2 and the usage units 104a, 104b are connected via the refrigerant communication tubes 13, 14, thereby constituting a heat-source-side refrigerant circuit 120. The usage units 104a, 104b constitute usage-side refrigerant circuits 50a, 50b. The usage units 104a, 104b, and the aqueous medium warming units 7a, 7b are connected via the aqueous medium communication tubes 15a, 16a, 15b, 16b, thereby constituting aqueous medium circuits 70a, 70b. The HFC-type refrigerant HFC-410A is enclosed as heat-source-side refrigerant in the heat-source-side refrigerant circuit 120. The HFC-type refrigerant HFC-134a is enclosed as a usage-side refrigerant in the usage-side refrigerant circuits 50a, 50b. A refrigerant for which the pressure corresponding to a saturation gas temperature of 65° C. is at most 2.8 MPa or lower, preferably 2.0 MPa or lower, in terms of gauge pressure is preferred for use as the usage-side refrigerant, from the perspective of usefulness as a refrigerant in a high-temperature refrigeration cycle. The refrigerant HFC-134a is one type of refrigerant that has such saturation pressure characteristics. Water as an aqueous medium is also circulated in the aqueous medium circuits 70a, 70b.

—Heat Source Unit—

The heat source unit 2 is installed outdoors, is connected to the usage units 104a, 104b via the refrigerant communication tubes 13, 14, and constitutes a portion of the heat-source-side refrigerant circuit 120. The heat source unit 2 has the same configuration as the heat source unit 2 of the first embodiment. Therefore, no detailed description of the heat source unit 2 of the present embodiment will be given.

—Liquid Refrigerant Communication Tube—

The liquid refrigerant communication tube 13 has the same configuration as the liquid refrigerant communication tube 13 of the first embodiment. Therefore, no detailed description of the liquid refrigerant communication tube 13 of the present embodiment will be given.

—Gas Refrigerant Communication Tube—

The gas refrigerant communication tube 14 has the same configuration as the gas refrigerant communication tube 14 of the first embodiment. Therefore, no detailed description of the gas refrigerant communication tube 14 of the present embodiment will be given.

—Usage Units—

The usage units 104a, 104b are installed indoors, are connected to the heat source unit 2 via the refrigerant communication tubes 13, 14, and constitute a portion of the heat-source-side refrigerant circuit 120. The usage units 104a, 104b also comprise usage-side refrigerant circuits 50a, 50b. The usage units 104a, 104b are also connected to the hot-water storage units 9a, 9b and the aqueous medium cooling/warming units 7a, 7b via the aqueous medium communication tubes 15a, 16a, 15b, 16b, and constitute a portion of the aqueous medium circuits 70a, 70b. The usage unit 104b has the same configuration as the usage unit 104a. Therefore, only the configuration of the usage unit 104a will be described. To refer to the configuration of the usage unit 104b, the subscript "b" is added instead of "a" to the reference signs for indicating the components of the usage unit 104a, and the components of the usage unit 104b will not be described.

The usage unit 104a has primarily the usage-side heat exchanger 41a, the usage-side expansion valve 42a, a usage-side compressor 62a, a refrigerant-water heat exchanger 65a, a refrigerant-water heat exchange-side expansion valve 66a, a usage-side accumulator 67a, and the circulation pump 43a.

The usage-side heat exchanger 41a is a heat exchanger for functioning as a heat-source-side refrigerant radiator by exchanging heat between the heat-source-side refrigerant and the usage-side refrigerant. The usage-side liquid refrigerant tube 45a is connected to the liquid side of the flow passage through which the heat-source-side refrigerant flows in the usage-side heat exchanger 41a, and the usage-side gas refrigerant tube 54a is connected to the gas side of the flow passage through which the heat-source-side refrigerant flows in the usage-side heat exchanger 41a. A cascade-side liquid refrigerant tube 68a is connected to the liquid side of the flow passage through which the usage-side refrigerant flows in the usage-side heat exchanger 41a, and a cascade-side gas refrigerant tube 71a is connected to the gas side of the flow passage through which the usage-side refrigerant flows in the usage-side heat exchanger 41a. The usage-side liquid refrigerant tube 45a is connected to the liquid refrigerant communication tube 13. The usage-side gas refrigerant tube 54a is connected to the gas refrigerant communication tube 14. The refrigerant-water heat exchanger 65a is connected to the cascade-side liquid refrigerant tube 68a, and the usage-side compressor 62a is connected to the cascade-side gas refrigerant tube 71a.

The usage-side expansion valve 42a is an electrically driven expansion valve whereby the flow rate of heat-source-side refrigerant flowing through the usage-side heat exchanger 41a can be varied by controlling the opening degree of the usage-side expansion valve 42a, and the usage-side expansion valve 42a is provided to the usage-side liquid refrigerant tube 45a.

The usage-side compressor 62a is a mechanism for compressing the usage-side refrigerant. The usage-side compressor 62a used herein is an airtight compressor in which a rotary-type, scroll-type, or other positive-displacement compression element (not shown) housed in a casing (not shown) is driven by a usage-side compressor motor 63a which is also housed in the casing. The rotation speed (i.e., the operating frequency) of the usage-side compressor motor 63a can be varied by an inverter apparatus (not shown), and the capacity of the usage-side compressor 62a can thereby be controlled. A cascade-side discharge tube 70a is connected to the discharge of the usage-side compressor 62a, and the cascade-side gas refrigerant tube 71a is connected to the intake of the usage-side compressor 62a.

The refrigerant-water heat exchanger 65a is a heat exchanger for functioning as a usage-side refrigerant radiator by exchanging heat between the usage-side refrigerant and the aqueous medium. The cascade-side liquid refrigerant tube 68a is connected to the liquid side of the flow passage through which the usage-side refrigerant flows in the refrigerant-water heat exchanger 65a, and the cascade-side discharge tube 70a is connected to the gas side of the flow passage through which the usage-side refrigerant flows in the refrigerant-water heat exchanger 65a. The usage-side water inlet tube 47a is connected to the inlet side of the flow passage through which the aqueous medium flows in the refrigerant-water heat exchanger 65a, and the usage-side water outlet tube 48a is connected to the outlet side of the flow passage through which the aqueous medium flows in the refrigerant-water heat exchanger 65a. The aqueous medium communication tube 15a is connected to the usage-side water inlet tube 47a, and the aqueous medium communication tube 16a is connected to the usage-side water outlet tube 48a.

The refrigerant-water heat exchange-side expansion valve 66a is an electrically driven expansion valve whereby the flow rate of usage-side refrigerant flowing through the refrigerant-water heat exchanger 65a can be varied by controlling the opening degree of the refrigerant-water heat exchange-side expansion valve 66a, and the refrigerant-water heat exchange-side expansion valve 66a is provided to the cascade-side liquid refrigerant tube 68a.

The usage-side accumulator 67a is provided to the cascade-side gas refrigerant tube 71a, and is a container for temporarily storing the usage-side refrigerant circulated through the usage-side refrigerant circuit 50a before being drawn into a usage-side compressor 55a.

The usage-side compressor 62a, refrigerant-water heat exchanger 65a, refrigerant-water heat exchange-side expansion valve 66a, usage-side heat exchanger 41a, and usage-side accumulator 67a are thus connected via the refrigerant tubes 70a, 68a, 71a, thereby constituting the usage-side refrigerant circuit 50a.

The circulation pump 43a is a mechanism for pressurizing the aqueous medium, and the circulation pump 43a used herein is a pump in which a centrifugal or positive-displacement pump element (not shown) is driven by a circulation pump motor 44a. The circulation pump 43a is provided to the usage-side water outlet tube 48a. The rotation speed (i.e., the operating frequency) of the circulation pump motor 44a can be varied by an inverter apparatus (not shown), and the capacity of the circulation pump 43a can thereby be controlled.

Various sensors are provided to the usage unit 104a. Specifically, the usage unit 104a is provided with the usage-side heat exchange temperature sensor 50a for detecting the usage-side heat exchange liquid-side temperature Rd, which is the temperature of the heat-source-side refrigerant on the liquid side of the usage-side heat exchanger 41a; the aqueous medium inlet temperature sensor 51a for detecting the aqueous medium inlet temperature Twr, which is the temperature of the aqueous medium in the inlet of the refrigerant-water heat exchanger 65a; the aqueous medium outlet temperature sensor 52a for detecting the aqueous medium outlet temperature Tw1, which is the temperature of the aqueous medium in the outlet of the refrigerant-water heat exchanger 65a; a usage-side intake pressure sensor 74a for detecting a usage-side intake pressure Ps2, which is the pressure of the usage-side refrigerant in the intake of the usage-side compressor 62a; a usage-side discharge pressure sensor 75a for detecting a usage-side discharge pressure which is the pressure of the usage-side refrigerant in the discharge of the usage-side compressor 62a; and a usage-side discharge temperature sensor 76a for detecting a usage-side discharge temperature Td2, which is the temperature of the usage-side refrigerant in the discharge of the usage-side compressor 62a. The usage unit 104a also has the usage-side controller 69a for controlling the operation of each component of the usage unit 104a. The usage-side controller 69a has a microcomputer and/or memory and other components for controlling the usage unit 104a. The usage-side controller 69a is configured so as to be capable of exchanging control signals and the like with a remote control (not shown), and exchanging control signals and the like with the heat-source-side controller 39 of the heat source unit 2.

—Hot-water Storage Units—

The hot-water storage units 9a, 9b are installed indoors, are connected to the usage units 104a, 1041) via the aqueous medium communication tubes 15a, 16a, 15b, 16b, and constitute a portion of the aqueous medium circuits 70a, 70b. The hot-water storage units 9a, 9b have the same configuration as the hot-water storage units 9a, 9b of the second embodiment. Therefore, no detailed description of the hot-water storage units 9a, 9b of the present embodiment will be given.

—Aqueous Medium Heating Units—

The aqueous medium warming units 7a, are installed indoors. The aqueous medium warming units 7a, 7b are connected to the usage units 104a, 104b via the aqueous medium communication tubes 15a, 16a, 15b, 16b, and constitute a portion of the aqueous medium circuits 70a, 70b. The aqueous medium warming units 7a, 7b have the same configuration as the aqueous medium cooling/warming units 7a, 7b of the second embodiment. Therefore, no detailed description of the aqueous medium warming units 7a, 7b of the present embodiment will be given.

—Aqueous Medium Communication Tubes—

The aqueous medium communication tubes 15a, 15b, 16a, 16b have the same configuration as the aqueous medium communication tubes 15a, 15b, 16a, 16b of the second embodiment. Therefore, no detailed description of the aqueous medium communication tubes 15a, 16a, 15b, 16b of the present embodiment will be given.

A controller 201a for controlling the operation of the heat pump system 201 is composed of the usage-side controllers 69a, 69b and the heat-source-side controller 39, and the controller 201a is configured to perform the operations and/or various types of control described below.

<Operation>

The operation of the heat pump system 201 will next be described.

Operation of the heat pump system 201 includes an air-warming operation mode for performing only the air-warming operation (heating operation) using the aqueous medium warming unit 7a and/or aqueous medium warming unit 7b; a hot-water supply operation mode for performing only the hot-water supply operation (heating operation) using the hot-water storage unit 9a and/or hot-water storage unit 9b; and a hot-water supply/air-warming operation mode for simultaneously performing the air-warming operation and the hot-water supply operation (heating operation) using the aqueous medium warming unit 7a and hot-water storage unit 9a, and/or the aqueous medium warming unit 7b and hot-water storage unit 9b. In the air-warming operation mode, the hot-water supply operation mode, and the hot-water supply/air-warming operation mode, the usage units 104a, 104b operate (heating operation) such that the usage-side heat exchangers 41a, 41b function as refrigerant radiators.

—Air-Warming Operation Mode—

In the case of performing only the air-warming operation using the aqueous medium warming unit 7a and/or aqueous medium warming unit 7b, the switching mechanism 23 is switched to the heat-source-side evaporating operation state (indicated by dashed lines in the switching mechanism 23 in FIG. 5) in the heat-source-side refrigerant circuit 120, and the intake return expansion valve 30 is closed. In the aqueous medium circuits 70a, 70b, the aqueous medium switching mechanisms 161a, 161b are switched to a state in which the aqueous medium is fed to the aqueous medium warming units 7a, 7b.

In the heat-source-side refrigerant circuit 120 in such a state, the heat-source-side refrigerant at a low pressure in the refrigeration cycle is drawn into the compressor 21 through the intake tube 21.c and compressed to a high pressure in the refrigeration cycle, and subsequently discharged to the discharge tube 21b. In the oil separator 22a, the refrigeration machine oil is separated from the high-pressure heat-source-side refrigerant discharged to the discharge tube 21b. The refrigeration machine oil separated from the heat-source-side refrigerant in the oil separator 22a is returned to the intake tube 2.1c through the oil return tube 22b. The high-pressure heat-source-side refrigerant from which the refrigeration machine oil has been separated is sent from the heat source unit 2 to the gas refrigerant communication tube 14 through the switching mechanism 23, the second heat-source-side gas refrigerant tube 25, and the gas-side shutoff valve 34.

The high-pressure heat-source-side refrigerant sent to the gas refrigerant communication tube 14 is sent to the usage units 104a, 104b. The high-pressure heat-source-side refrigerant sent to the usage units 104a, 104h is sent to the usage-side heat exchangers 41a, 41b through the usage-side gas refrigerant tubes 54a, 54b. The high-pressure heat-source-side refrigerant sent to the usage-side heat exchangers 41a, 41b is heat-exchanged and radiated in the usage-side heat exchangers 41a, 41b with the usage-side refrigerant, which is at a low pressure in the refrigeration cycle and is circulated through the usage-side refrigerant circuits 50a, 50b. The high-pressure heat-source-side refrigerant radiated in the usage-side heat exchangers 41a, 41b is sent from the usage units 104a, 104b to the liquid refrigerant communication tube 13 through the usage-side expansion valves 42a, 42b and the usage-side liquid refrigerant tubes 45a, 45b.

The heat-source-side refrigerant sent to the liquid refrigerant communication tube 13 is sent to the heat source unit 2. The heat-source-side refrigerant sent to the heat source unit 2 is sent to the subcooler 31 through the liquid-side shutoff valve 33. Since the heat-source-side refrigerant does not flow to the intake return tube 29, the heat-source-side refrigerant sent to the subcooler 31 is sent to the heat-source-side expansion valve 28 without being heat-exchanged. The heat-source-side refrigerant sent to the heat-source-side expansion valve 28 is depressurized in the heat-source-side expansion valve 28 to a low-pressure gas-liquid two-phase state, and sent to the heat-source-side heat exchanger 26 through the heat-source-side liquid refrigerant tube 27. The low-pressure heat-source-side refrigerant sent to the heat-source-side heat exchanger 26 is heat-exchanged and evaporated in the heat-source-side heat exchanger 26 with the outdoor air fed by the heat-source-side fan 36. The low-pressure heat-source-side refrigerant evaporated in the heat-source-side heat exchanger 26 is sent to the heat-source-side accumulator 32 through the first heat-source-side gas refrigerant tube 24 and the switching mechanism 23. The low-pressure heat-source-side refrigerant sent to the heat-source-side accumulator 32 is again drawn into the compressor 21 the intake tube 21c.

In the usage-side refrigerant circuits 50a, 50b, the usage-side refrigerant, which is at a low pressure in the refrigeration cycle and is circulated through the usage-side refrigerant circuits 50a, 50b, is heated and evaporated by the radiating of the heat-source-side refrigerant in the usage-side heat exchangers 41a, 41b. The low-pressure usage-side refrigerant evaporated in the usage-side heat exchangers 41a, 41b is sent to the usage-side accumulators 67a, 67b through the cascade-side gas refrigerant tubes 71a, 71b. The low-pressure usage-side refrigerant sent to the usage-side accumulators 67a, 67b is drawn into the usage-side compressors 62a, 62b and compressed to a high pressure in the refrigeration cycle, and subsequently sent to the cascade-side discharge tubes 70a, 70b. The high-pressure usage-side refrigerant discharged to the cascade-side discharge tubes 70a, 70b is sent to the refrigerant-water heat exchangers 65a, 65b. The high-pressure usage-side refrigerant sent to the refrigerant-water heat exchangers 65a, 65b is heat-exchanged and radiated in the refrigerant-water heat exchangers 65a, 656 with the aqueous medium circulated through the aqueous medium circuits 70a, 70b by the circulation pumps 43a, 43b. The high-pressure usage-side refrigerant radiated in the refrigerant-water heat exchangers 65a, 65b is depressurized in the refrigerant-water heat exchange-side expansion valves 66a, 666 to a low-pressure gas-liquid two-phase state and sent again to the usage-side heat exchangers 41a, 41b through the cascade-side liquid refrigerant tubes 68a, 68b.

In the aqueous medium circuits 704, 70b, the aqueous medium circulated through the aqueous medium circuits 70a, 70b is heated by the radiating of the heat-source-side refrigerant in the usage-side heat exchangers 41a, 41b. The aqueous medium heated in the usage-side heat exchangers 41a, 41b is drawn into the circulation pumps 43a, 43b through the usage-side water outlet tithes 48a, 48b and pressurized, and subsequently sent from the usage units 104a, 104b to the aqueous medium communication tubes 16a, 16b. The aqueous medium sent to the aqueous medium communication tubes 16a, 16b is sent to the aqueous medium warming units 7a, 7b through the aqueous medium switching mechanisms 161a, 161b. The aqueous medium sent to the aqueous medium warming units 7a, 7b is radiated in the heat exchange panels 71a, 71b, the walls and other indoor areas are thereby heated, and the indoor floor is heated.

The operations in the air-warming operation mode thr performing only the air-warming operation using the aqueous medium warming unit 7a and/or aqueous medium warming unit 7b are thus performed.

—Hot-water Supply Operation Mode—

In the case of performing only the hot-water supply operation using the hot-water storage unit 9a and/or hot-water storage unit 9b, the switching mechanism 23 is switched to the heat-source-side evaporating operation state (indicated by dashed lines in the switching mechanism 23 in FIG. 5) in the heat-source-side refrigerant circuit 120, and the intake return expansion valve 30 is closed. In the aqueous medium circuits 70a, 70b, the aqueous medium switching mechanisms 161a, 161b are switched to a state in which the aqueous medium is fed to the hot-water storage units 9a, 9b.

In the heat-source-side refrigerant circuit 120 in such a state, the same operations as those of the air-warming operation described above are performed.

In the aqueous medium circuits 70a, 70b, the aqueous medium sent from the usage units 104a, 104b to the aqueous medium communication tubes 16a, 16b is sent to the hot-water storage units 9a, 9b through the aqueous medium switching mechanisms 161a, 161b. The aqueous medium sent to the hot-water storage units 9a, 9b is heat-exchanged and radiated in the heat exchange coils 92a, 92b with the aqueous medium in the hot-water storage tanks 91a, 91b, and the aqueous medium in the hot-water storage tanks 91a, 91b is thereby heated.

The operations in the hot-water supply operation mode for performing only the hot-water supply operation using the hot-water storage unit 9a and/or hot-water storage unit 9b are thus performed.

—Hot-water Supply/Air-warming Operation Mode—

In the case of simultaneously performing the air-warming operation and the hot-water supply operation using the aqueous medium cooling/warming unit 7a and hot-water storage unit 9a, and/or the aqueous medium cooling/warning unit 7b and hot-water storage unit 9b, the switching mechanism 23 is switched to the heat-source-side radiating operation state (indicated by dashed lines in the switching mechanism 23 in FIG. 5) in the heat-source-side refrigerant circuit 120, and the intake return expansion valve 30 is closed. In the aqueous medium circuits 70a, 70b, the aqueous medium switching mechanisms 161a, 161b are switched to a state in which the aqueous medium is fed to the aqueous medium cooling/warming units 7a, 7b and the hot-water storage units 9a, 9b.

In the heat-source-side refrigerant circuit 120 in such a state, the same operations as those of the air-warming operation described above are performed.

In the aqueous medium circuits 70a, 70b, the aqueous medium sent from the usage units 104a, 104b to the aqueous medium communication tubes 16a, 16b is sent to the aqueous medium warming units 7a, 7b and the hot-water storage units 9a, 9b through the aqueous medium switching mechanisms 161a, 161b. The aqueous medium sent to the aqueous medium warming units 7a, 7b is radiated in the heat exchange panels 71a, 71b, the walls and other indoor areas are thereby heated, and the indoor floor is heated. The aqueous medium sent to the hot-water storage units 9a, 9b is also heat-exchanged and radiated in the heat exchange coils 92a, 92b with the aqueous medium in the hot-water storage tanks 91a, 91b, and the aqueous medium in the hot-water storage tanks 91a, 91b is thereby heated.

The operations in the hot-water supply/air-warming operation mode for simultaneously performing the air-warming operation and hot-water supply operation using the aqueous medium warming unit 7a and hot-water storage unit 9a, and/or the hot-aqueous medium warming unit 7b and hot-water storage unit 9b are thus performed.

—Various Types of Control—

The heat pump system 201 is also configured so as to perform subcooling degree control through the use of the usage-side expansion valves 42a, 42b, superheat degree control through the use of the heat-source-side expansion valve 28, control in response to refrigerant excess and/or refrigerant deficiency (i.e., refrigerant recovery control, overflow prevention control, and refrigerant evacuation control), and control at the start of the heating operation in air-warming operation as the heating operation, hot-water supply operation, and hot-water supply/air-warming operation, the same as in the heat pump system 1 of the first embodiment. These types of control are the same as the control performed in the heat pump system 1 of the first embodiment, and no detailed description thereof will be given in the present embodiment.

<Characteristics>

—A—

The heat pump system 201 differs from the heat pump system 101 of the second embodiment with respect to using a dual refrigeration cycle composed of the heat-source-side refrigerant circuit 120 and the usage-side refrigerant circuits 50a, 50b. Therefore, a high-temperature aqueous medium can be obtained more easily in the heat pump system 201 than in the heat pump system 101 of the second embodiment.

—B—

Since the heat pump system 201 also has the heat-source-side accumulator 32, problems emerge in handling refrigerant excess and refrigerant deficiency during the heating operation (air-warming operation, hot-water supply operation, and hot-water supply/air-warming operation herein), the same as in the heat pump system 1 of the first embodiment. However, the same types of control as are performed in the heat pump system 1 of the first embodiment are performed in the heat pump system 201. The same operational effects as those of the heat pump system 1 of the first embodiment can therefore be obtained in the heat pump system 201 with respect to problems that arise in handling refrigerant excess and/or refrigerant deficiency.

(4) Other Embodiments

Embodiments of the present invention were described above based on the drawings, but the specific configuration of the present invention is not limited to these embodiments, and can be changed within a range that does not deviate from the scope of the invention.

—A—

In the heat pump system 1 described above, the usage units 4a, 4b and/or the usage units 104a, 104b may be furthermore connected. The usage units 104a, 104b may also be furthermore connected in the heat pump system 201 described above. The heat pump systems 1, 101, 201 may also be configured so as to be capable of simultaneous air-cooling and heating.

—B—

In the heat pump system 201 described above, HFC-134a is used as the usage-side refrigerant, but this configuration is not limiting, and HFO-1234yf (2,3,3,3-tetrafluoro-1-propene), for example, or another refrigerant may be used for which the pressure corresponding to a saturation gas temperature of 65° C. is at most 2.8 MPa or lower, preferably 2.0 MPa or lower, in terms of gauge pressure.

Industrial Applicability

The present invention is broadly applicable to heat pump systems configured so that a usage unit is connected to a heat source unit which has an accumulator.

1, 101, 201 heat pump system
1a, 101a, 201a controller
2 heat-source unit
4a, 4b, 8a, 8b, 104a, 104b usage unit
20, 120 heat-source-side refrigerant circuit (refrigerant circuit)
21 heat-source-side compressor (compressor)
26 heat-source-side heat exchanger
28 heat-source-side expansion valve
32 heat-source-side accumulator (accumulator)
41a, 41b, 81a, 81b usage-side heat exchanger
42a, 42b, 82a, 82b usage-side expansion valve

CITATION LIST

Patent Literature

<Patent Literature 1>
Japanese Laid-open Patent Publication No, 2007-163099

What is claimed is:

1. A heat pump system comprising:
a refrigerant circuit including
a usage unit having a usage-side expansion valve and a usage-side heat exchanger
a heat source unit connected to said usage unit, said heat source unit having
a compressor configured to compress a refrigerant,
a heat-source-side heat exchanger,
a heat-source-side expansion valve, and
an accumulator connected to an intake of said compressor; and
a controller configured to control said refrigerant circuit
to perform a heating operation in which said usage-side heat exchanger functions as a refrigerant radiator and
to control said usage-side expansion valve so that a degree of subcooling of refrigerant in an outlet of said usage-side heat exchanger during said heating operation is equal to a predetermined target degree of subcooling of the refrigerant in the outlet of said usage-side heat exchanger,
said controller being further configured to control said refrigerant circuit to perform refrigerant recovery control in which
said heat-source-side expansion valve is controlled such so that a degree of superheat of refrigerant an outlet of said heat-source-side heat exchanger functioning as a refrigerant evaporator is equal to a predetermined target degree of superheat of the refrigerant in the outlet of said heat-source-side heat exchanger,
said predetermined target degree of superheat is changed so that the refrigerant in the outlet of said heat-source-side heat exchanger is wet when said usage-side expansion valve is opened to an opening degree greater than a predetermined opening degree at a start of refrigerant recovery, and
change in said predetermined target degree of superheat is cancelled when said usage-side expansion valve is closed to an opening degree smaller than a predetermined opening degree at an end of refrigerant recovery.

2. The heat pump system according to claim 1, wherein said controller changes said predetermined target degree of superheat to less than 0° C. during said refrigerant recovery control.

3. The heat pump system according to claim 2, wherein said controller sets said predetermined target degree of superheat to 0° C. to 1° C. when not performing said refrigerant recovery control.

4. The heat pump system according to claim 1, wherein said opening degree of said heat-source-side expansion valve at the end of refrigerant recovery is smaller than said opening degree of said heat-source-side expansion valve at the start of refrigerant recovery.

5. The heat pump system according to claim 1, wherein said controller being further configured to control said refrigerant circuit to perform overflow prevention control in which said predetermined target degree of superheat is changed so that said degree of superheat increases when a degree of superheat of refrigerant in a discharge of said compressor is less than a predetermined lower limit discharge degree of superheat,
the overflow prevention control being performed with priority over said refrigerant recovery control.

6. The heat pump system according to claim 1, wherein said controller being further configured to control said refrigerant circuit to perform refrigerant evacuation control in which
said predetermined target degree of superheat is changed so that said degree of superheat of refrigerant in the outlet of said heat-source-side heat exchanger increases when said usage-side expansion valve is closed to an opening degree smaller than a predetermined opening degree at a start of refrigerant evacuation, and
change in said predetermined target degree of superheat is cancelled when said usage-side expansion valve is opened to an opening degree greater than a predetermined opening degree at an end of refrigerant evacuation.

7. The heat pump system according to claim 6, wherein said controller sets said predetermined target degree of superheat to 0° C. to 1° C. when not performing said refrigerant recovery control and refrigerant evacuation control.

8. The heat pump system according to claim 7, wherein said controller changes said predetermined target degree of superheat to 2° C. or higher during said refrigerant evacuation control.

9. The heat pump system according to claim 6, wherein said opening degree of said usage-side expansion valve at the start of refrigerant evacuation is less than said opening degree of said usage-side expansion valve at the end of refrigerant evacuation.

10. The heat pump system according to claim 1, wherein said controller sets said heat-source-side expansion valve to an opening degree of 30% or less than a maximum opening degree thereof and sets said usage-side expansion valve to an opening degree of 50% or more of a maximum opening degree thereof at a start of said heating operation.

* * * * *